(12) United States Patent
Lancioni et al.

(10) Patent No.: US 12,401,687 B2
(45) Date of Patent: Aug. 26, 2025

(54) PHISHING DETECTION VIA GRAMMATICAL ARTIFACTS

(71) Applicant: McAfee, LLC, San Jose, CA (US)

(72) Inventors: German Lancioni, San Jose, CA (US); Oliver G. Devane, Upton (GB)

(73) Assignee: McAfee, LLC, San Jose, CA (US)

(*) Notice: Subject to any disclaimer, the term of this patent is extended or adjusted under 35 U.S.C. 154(b) by 318 days.

(21) Appl. No.: 18/140,956

(22) Filed: Apr. 28, 2023

(65) Prior Publication Data

US 2024/0364736 A1 Oct. 31, 2024

(51) Int. Cl.
*H04L 9/40* (2022.01)
*G06F 40/205* (2020.01)
*G06F 40/232* (2020.01)
*G06F 40/242* (2020.01)

(52) U.S. Cl.
CPC ........ *H04L 63/1483* (2013.01); *G06F 40/205* (2020.01); *G06F 40/232* (2020.01); *G06F 40/242* (2020.01)

(58) Field of Classification Search
CPC .. H04L 63/1483; H04W 12/12; G06F 40/232; G06F 40/205; G06F 40/242
USPC ........................................................ 726/22
See application file for complete search history.

(56) References Cited

U.S. PATENT DOCUMENTS

| | | | |
|---|---|---|---|
| 8,806,622 B2 | 8/2014 | Waterson et al. | |
| 10,574,696 B2 | 2/2020 | Celik | |
| 10,769,370 B2* | 9/2020 | Zhu | G06F 40/253 |
| 12,041,084 B2* | 7/2024 | Prakash | H04L 63/1483 |
| 2007/0294352 A1 | 12/2007 | Shraim et al. | |
| 2015/0200963 A1* | 7/2015 | Geng | H04L 63/1483 726/22 |
| 2017/0075877 A1* | 3/2017 | Lepeltier | G06F 40/117 |
| 2021/0021638 A1 | 1/2021 | Lancioni et al. | |
| 2021/0105298 A1* | 4/2021 | Nagaraja | G06F 21/566 |
| 2021/0144174 A1 | 5/2021 | N | |
| 2021/0176272 A1 | 6/2021 | Maha et al. | |
| 2021/0377300 A1 | 12/2021 | Devane et al. | |

(Continued)

OTHER PUBLICATIONS

Conneau et al., "Unsupervised Cross-lingual Representation Learning at Scale," Proceedings of the 58th Annual Meeting of the Association for Computational Linguistics, pp. 8440-8451, dated Jul. 5-10, 2020, 12 pages.

(Continued)

*Primary Examiner* — Frantz B Jean
(74) *Attorney, Agent, or Firm* — Patent Capital Group

(57) ABSTRACT

There is disclosed a method of mitigating phishing, including extracting text from a website under analysis; using a spell check algorithm to compare extracted words or phrases to a language dictionary of words or phrases selected from web pages known to be phishing targets, and using a spell counter to count misspell hits from the spell check algorithm; comparing the extracted words or phrases to a case-sensitive usage reference, and using a usage counter to count mismatched usage hits from the case-sensitive usage reference; combining the spell counter and the usage counter into a combined counter; and using the combined counter to identify the website under analysis as a suspected phishing website and taking a phishing mitigation action.

20 Claims, 14 Drawing Sheets

(56) References Cited

U.S. PATENT DOCUMENTS

2022/0217154 A1* 7/2022 Song ............... H04L 51/48
2023/0033134 A1* 2/2023 Kurrasch ............... H04L 63/20

OTHER PUBLICATIONS

Devlin et al., "BERT: Pre-training of Deep Bidirectional Transformers for Language Understanding," dated May 24, 2019, Proceedings of NAACL-HLT 2019, 16 pages.

Huang et al., "Methods and Apparatus to Implement Trusted Transfer Learning on Transformer-Based Phishing Detection," U.S. Appl. No. 17/941,919, filed Sep. 9, 2022, McAfee, LLC, San Jose, CA, US, 106 pages.

Sun et al., "MobileBERT: a Compact Task-Agnostic BERT for Resource-Limited Devices," arXiv:2004.02984 [cs.CL], submitted Apr. 6, 2020, retrieved from [https://arxiv.org/abs/2004.02984] on Jul. 21, 2022, 13 pages.

Van Der Maaten, "Visualizing Data using t-SNE," dated Nov. 8, 2008, Journal of Machine Learning Research 9 (2008) 2579-2605, 27 pages.

* cited by examiner

| Text | Frequency | Case Sensitivity Correction Weight |
|---|---|---|
| Contact Us | 51 | 1 |
| username | 50 | 1 |
| Remember Me | 48 | 1 |
| Forgot | 47 | 1 |
| Copyright | 47 | 1 |
| Password | 42 | 0.5 |
| Online | 33 | 0.5 |
| Sign In | 27 | 0.33 |
| Banking | 27 | 1 |
| Welcome | 25 | 0.5 |
| Disclosures | 24 | 1 |
| welcome | 23 | 0.5 |
| Locations | 18 | 1 |
| online | 16 | 0.5 |
| Sign in | 14 | 0.33 |
| Sign-in | 9 | 0.33 |
| password | 6 | 0.5 |

PHISHING DETECTION VIA GRAMMATICAL ARTIFACTS

This application relates in general to data security, and more particularly though not exclusively to phishing detection via grammatical artifacts.

BACKGROUND

Phishing is a type of cybersecurity attack in which the attacker creates a web page that mimics a legitimate web page (such as of a bank or e-commerce website), in hope of deceiving end consumers into entering sensitive information such as banking, financial, or personal data.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
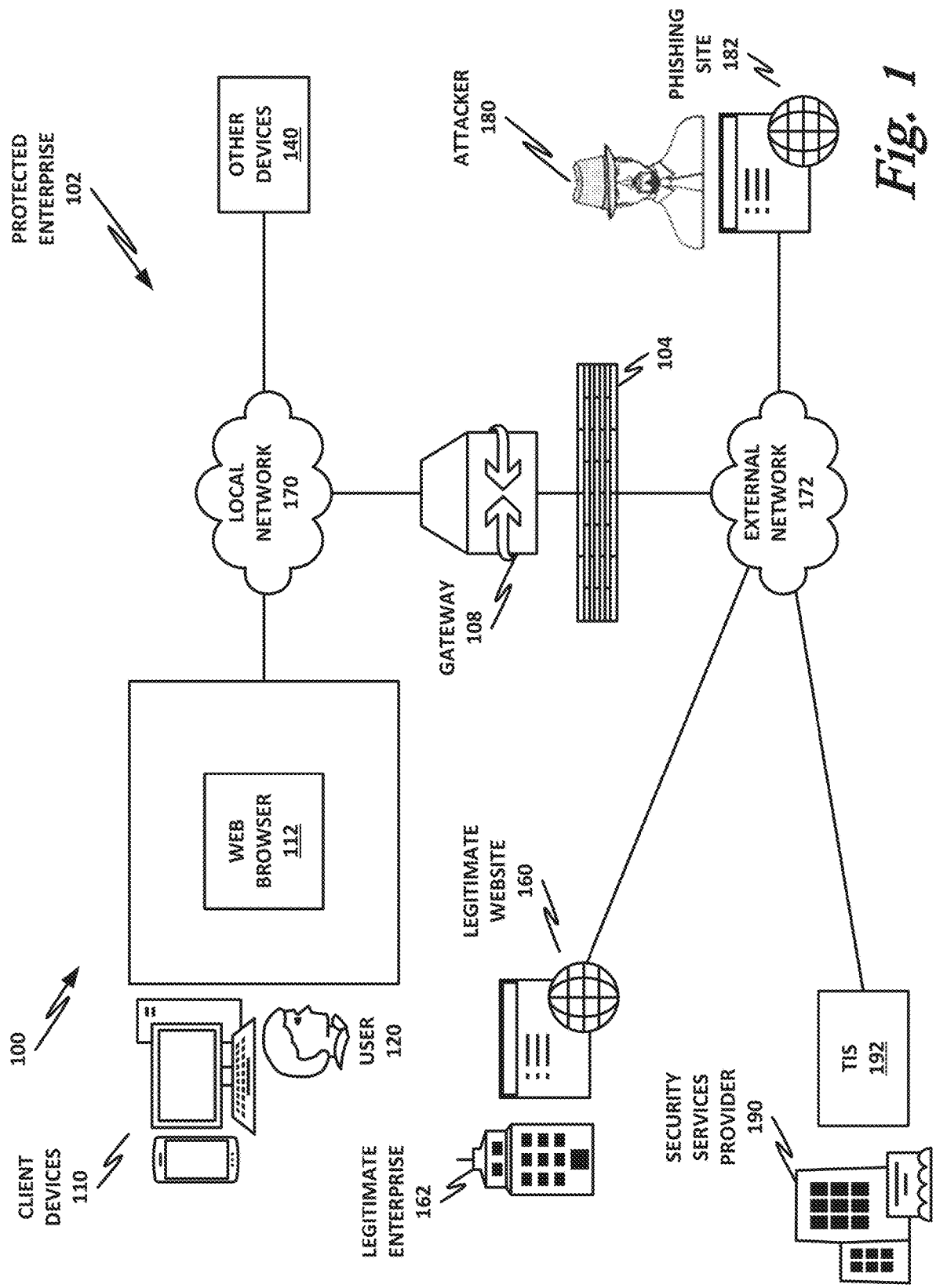
FIG. 1 is a block diagram of selected elements of a phishing mitigation ecosystem.

There is disclosed a method of mitigating phishing, including extracting text from a website under analysis; using a spell check algorithm to compare extracted words or phrases to a language dictionary of words or phrases selected from web pages known to be phishing targets, and using a spell counter to count misspell hits from the spell check algorithm; comparing the extracted words or phrases to a case-sensitive usage reference, and using a usage counter to count mismatched usage hits from the case-sensitive usage reference; combining the spell counter and the usage counter into a combined counter; and using the combined counter to identify the website under analysis as a suspected phishing website and taking a phishing mitigation action.

Embodiments of the Disclosure

Overview

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

As phishing websites become more sophisticated, they become more difficult to detect and identify. Highly sophisticated phishing websites may be difficult not only for end users, but even for security agents and other mechanisms that electronically detect phishing websites. Modern advanced phishing websites may be visually and textually similar to, or nearly identical to, their legitimate counterparts. Thus, many of the detection mechanisms may rely on uniform resource locator (URL) analysis, domain analysis, hypertext markup language (HTML) or JavaScript inspection, or other similar techniques.

While these methods have proven to be effective in many cases, even state-of-the-art detection means fail to detect many phishing websites. The difficulty is exacerbated because many phishing websites only remain online for a few minutes, which limits the ability of cybersecurity solutions and researchers to fully analyze the websites.

The teachings of the present specification do not necessarily displace existing phishing detection mechanisms, but in some embodiments may supplement those existing mechanisms. Observationally, many phishing websites include unusual near-misspellings or grammatical artifacts such as unusual capitalizations that are not often found in legitimate websites. Thus, the present specification provides a system and method that analyzes a phishing website based on the grammar, spelling, and syntax of the text found within the website. In general terms, a website may be deemed a suspected phishing website when unusual usage patterns are detected, such as incorrect spelling, unusual syntax, or unusual capitalization. Separate counters may be used to track these grammatical artifacts when they are found. In some embodiments, two or more counters may be combined, such as in a weighted sum or in a normalized sum (e.g., normalized to between 0 and 1). These counters (individually or combined) may be used an input to a decision module, which may determine whether to mark the website under analysis as a suspected phishing website. If the website is so "decorated," or in other words marked, set aside, highlighted, or otherwise given special treatment. Then it may also be subject to additional human and/or machine analysis, or other phishing mitigation action.

In illustrative embodiments, spelling errors and grammatical irregularities may be tracked and scored separately. The two scores may then be combined according to a suitable algorithm which may include a straight sum, a weighted sum, or some other algorithm, and the result may be used for phishing detection. In one embodiment, the aggregate count may be compared to a threshold and a value above the threshold may be used to identify a potential phishing website. Alternatively, the aggregate sum may be provided as an input to a broader phishing detection algorithm, such as a feature for a machine learning (ML) algorithm that detects phishing websites. The system may realize efficiency by using existing spell correction algorithms to find spelling artifacts, and textual comparison to find capitalization artifacts. These artifacts may be used to infer or partially infer phishing intent.

More specifically, artifacts may be detected by a pair of mechanisms including a symmetric delete spell correction and a case sensitivity check. In combination, these two approaches can yield a score that may be used to flag phishing websites, either in isolation or in combination with other features.

This approach is beneficial because phishing websites often include these kinds of spelling and grammatical artifacts, while they are relatively rare in legitimate professional websites. Indeed, in the legitimate professional websites that are frequently targeted by phishing attackers (e.g., the most popular websites for large banks and e-commerce providers), spelling errors are practically unheard of. These websites are generally edited by professional copy editors who are adept at identifying spelling errors.

Capitalization artifacts are also uncommon, though some allowance may be necessary for differences in preference or style. In the case of phishing websites, it is conceivable that spelling and grammatical errors are the result of the producers not being native speakers of the target language. It is also possible that the misspellings and grammatical irregularities are intentional. Some existing phishing detection mechanisms use a hash of a webpage and compare the hash to a hash for a known good webpage. If the two webpages have an identical hash, but the URL for the suspicious webpage is not owned by the legitimate owner of the website, then the website can be detected as phishing. Introducing minor spelling or grammatical irregularities into such websites may have the effect of defeating such hash-based comparisons.

Regardless of the specific reason for the occurrence of spelling and grammatical irregularities, in practice modern phishing websites often include these. Thus, detection of grammatical and spelling irregularities can aid in the detection of phishing websites.

This approach can realize advantages over existing solutions that do not account for typos or misspellings and case sensitivity when performing phishing detection. Even deep learning algorithms that analyze phishing websites may require large volumes of data to spot such artifacts, and may still have limitations in detecting them. Thus, these simple spelling correction and case sensitivity algorithms, which require relatively few compute resources and can be performed relatively quickly, can provide a useful detection mechanism or a supplement to ML or other, more complex algorithms.

This approach may provide another advantage by supplementing URL-based detections. As phishing attackers have adapted to known detection techniques, it has become less common for phishing URLs to include names for the websites they are imitating. For example, a phishing website that attempts to imitate the fictional, large "ABC Bank" may include in its URL, "ABCbank.com.garbageURL." When human users see ABCbank.com, they may assume that the URL belongs to the legitimate ABC Bank. But this artifact also gives the phishing detection algorithm a clue as to which bank the phishing website is mimicking. This allows the phishing detection mechanism to easily identify the mimicked website, and to convict the website as phishing.

However, as modern phishing websites often exclude such misleading URLs (perhaps on the theory that most users won't look at the address bar anyway), URL-based solutions can be unreliable. Thus, the two-part detection of the present specification may supplement existing detection mechanisms. The first part may include a spelling and grammar check, and the second part may include another algorithm (including a prior art algorithm), which may incorporate the grammar and spelling score as an input. The system may thus arrive at a final score that can be used to determine whether a website is likely a phishing website.

Embodiments disclosed herein include two separate stages. In the first stage, the system performs a preparation in which websites that are known phishing targets (e.g., the top 100, 150, 200, 300, 500, 750, or 1000 known phishing targets) are analyzed grammatically to provide a baseline for comparison. At detection time, a website is classified according to a spell check algorithm and a case-sensitive usage check. In summary, the method includes the following steps:

1. Collect text from login websites (or other data entry websites) of the most popular and targeted websites from different locales.
2. Merge text from all websites into a single collection and create a histogram of words found in those websites.
3. Select the top x most frequent words (regardless of their spelling or case sensitivity) and discard the non-frequent words according to the x threshold. Notably, this step is not case sensitive and may also account for common substitutions such as hyphens for spaces. For example, the words "Sign in," "sign in," and "sign-in" would be considered valid entries within the same species. However, this system may track how many variants are observed of the same word or pattern. This can be used to compute a case sensitivity correction weight.
4. The case sensitivity correction weight is computed as 1/g, where g is the number of word variants. For example, in the previous "sign in" case, there are three legitimate variants of the word or phrase, so the weight would be ⅓ or 0.33.
5. The system may then create a "language" dictionary based on the selected list of most frequent words, maintaining case sensitivity. Here "language" does not imply locale (e.g., "English," "Spanish," "French," etc.). Rather, language means a dictionary that includes the target words that the artifact detection algorithm will use to spot potential phishing in the second stage. This dictionary can contain words from multiple human languages such as English, French, Spanish, Chinese, and others.

Conceptually, the language dictionary may optionally be divided into a case-insensitive spelling dictionary, and a case-sensitive usage reference or usage dictionary. Once the language dictionary has been populated, the system may perform a detection stage on a suspicious website. The detection stage may be divided into two subphases, namely a spelling detection phase and a case sensitivity phase.

In analyzing a suspicious website, a security agent may use a symmetric delete spelling correction algorithm to identify misspellings within the website, using the language dictionary (or more specifically, the case-insensitive spelling dictionary) as a baseline. In embodiments, the security agent may use a small edit distance such as 2 or even 1. In many cases, typos or misspellings on phishing websites are not expected to be extreme. Extreme misspellings may, in fact, be a problem for the phishing attacker because they may be easily detected by an end user and trigger a suspicious instinct. But very minor misspellings may defeat a hashing algorithm, while having a lower chance of triggering the suspicion of end users. The security agent may try to find and spell correct words to fit the language dictionary that was created in the first stage. Legitimate websites generally comply with the expected spelling, particularly because the dictionary was created from legitimate websites. In selected embodiments, there may be provision for regional variations in spelling (e.g., "color" for US versus "colour" for Canada or the UK). In those cases, the counter may be weighted based on the number of variations, as in the case of the case-sensitive usage counter described below.

For legitimate websites, the spell check algorithm may be expected to find zero spelling corrections. This indicates an absence of phishing artifacts. But when the algorithm is run on phishing websites, the algorithm may find words that need spelling correction (e.g., "pasword" which is missing a single "s" and is more difficult for human users to detect, "welcme" which is missing a single "o," or "copyrgiht" which has swapped the "g" with the "i"). These minor misspellings may be deliberately crafted to not visually trigger suspicion instincts in end users, but they will be easily caught by the symmetric delete spelling correction algorithm. If the algorithm identifies instances of misspellings, the system may increment a spelling artifact counter for every word that requires spelling correction. This artifact counter may be used in combination with the counter of the second phase to provide a final score.

In the second subphase of the second stage, a case sensitivity check may be performed. The symmetric delete spelling correction algorithm may be case insensitive, so a secondary algorithm may identify artifacts based on subtle case sensitivity violations. Because the language dictionary was created according to how legitimate websites commonly type key words, the system may infer an implicit convention that should be followed with certain case logic. For example, "Contact Us" is almost always written with two words starting with uppercase characters. The case sensitivity check algorithm may go over the words in the language dictionary without case sensitivity, and if it finds an occurrence within the website under analysis, the algorithm may compare the word found against the word registered in the language dictionary.

In this case, the comparison is case sensitive. If the compared word does not match any entry in the dictionary, the algorithm may apply a weight from a "case sensitivity correction weight" of the case insensitive matching element, and add this weight to a secondary case artifact counter. For example, if the word "passWord" is found on the website, it will match the words "Password" and "password" in the dictionary. The word will match both of these because there is a case insensitive comparison. But the case will not match either of the entries in the dictionary when the case sensitive comparison is performed. Because the case does not match, the word will be considered a hit and will be given a weight. In this case, both legitimate forms of the word (e.g., "Password" and "password") have the same weight.

Thus, the case sensitivity correction weight for the word "passWord" is 0.5. If a second artifact with weight 1.0 were found on the same website, then the case-sensitive artifact counter would be 0.5+1=1.5. The case sensitivity correction weight of 0.5 would be for a hit on "password" because there are two versions of that word, while the weight of 1.0 would be for a hit on another term with only one version.

This method allows the security agent to quickly compute a spelling artifact counter and a case-sensitive artifact counter. These may also be referred to as a spell correction artifact counter and a secondary case artifact counter. These two counters may be combined via any suitable algorithm or equation that accounts for both variables. Furthermore, in some cases a single occurrence of a misspelling may be considered particularly suspicious, and may per se trigger detection of phishing, or may trigger additional analysis.

Combining the two counters may include any suitable function of the two variables. For example, the two counters could be summed. Alternatively, one counter could be multiplied by the other. In another embodiment, a weighted sum may be computed. For example:

$$C = mk + nj$$

Where C is the combined counter, k is the spelling artifact counter, m is a spelling artifact counter weight (e.g., between 0 and 1), j is the case-sensitive usage counter, and n is a usage counter weight (e.g., between 0 and 1).

More generally, C may be computed as any suitable function of the two variables:

$$C = f(j, k)$$

The final aggregate counter C may be treated as a score that can be used to track how many phishing text artifacts have been found when analyzing a website. This counter can be compared to a threshold to determine if the website should be classified as phishing or not. For example, two spell correction artifacts and one case artifact could trigger a phishing detection. One spell correction artifact and one or more case artifacts may trigger a detection. Or other thresholds may be used. Furthermore, the aggregate artifact counter may be used as an input for another algorithm, such as an input feature for a neural network, or a factor in a larger phishing analysis engine. Upon convicting a website as a phishing website or suspected phishing website, additional security measures may be appropriate, such as blocking the website, notifying a security administrator, warning the user, or other.

Selected Embodiments

The foregoing can be used to build or embody several example implementations, according to the teachings of the present specification. Some example implementations are included here as non-limiting illustrations of these teachings.

Example 1 includes a computer-implemented method of mitigating phishing, comprising extracting text from a website under analysis; using a spell check algorithm to compare extracted words or phrases to a language dictionary of words or phrases selected from web pages known to be phishing targets, and using a spell counter to count misspell hits from the spell check algorithm; comparing the extracted words or phrases to a case-sensitive usage reference, and using a usage counter to count mismatched usage hits from the case-sensitive usage reference; combining the spell counter and the usage counter into a combined counter; and using the combined counter to identify the website under analysis as a suspected phishing website and taking a phishing mitigation action.

Example 2 includes the method of example 1, further comprising performing a pre-analysis collection phase, comprising selecting a set of web pages known to be phishing targets, collecting common words and phrases from the set of web pages, and building the language dictionary and case-sensitive usage reference.

Example 3 includes the method of example 2, wherein building the language dictionary comprises building a histogram of most common words and phrases in the set of web pages.

Example 4 includes the method of example 2, wherein the set of web pages comprises web pages determined to be most popular as phishing targets.

Example 5 includes the method of example 2, wherein the set of web pages comprises pages from a domain that collect sensitive personal or financial data.

Example 6 includes the method of example 1, wherein the spell check algorithm is case insensitive.

Example 7 includes the method of example 1, wherein the spell check algorithm comprises symmetric delete.

Example 8 includes the method of example 1, wherein combining the spelling counter and the usage counter comprises a weighted sum.

Example 9 includes the method of example 1, wherein combining the spelling counter and the usage counter comprises computing a normalized sum.

Example 10 includes the method of example 1, wherein identifying the website under analysis as a suspected phishing website comprises using the combined counter as an input to a phishing analysis engine.

Example 11 includes the method of example 1, wherein identifying the website under analysis as a suspected phishing website comprises using the combined counter as an input to an artificial intelligence algorithm.

Example 12 includes the method of example 1, wherein identifying the website under analysis as a suspected phishing website comprises determining that the website includes two or more misspellings.

Example 13 includes the method of example 1, wherein identifying the website under analysis as a suspected phishing website comprises determining that the website under analysis includes one or more misspellings, and two or more usage mismatches.

Example 14 includes the method of example 1, wherein the phishing mitigation action comprises decorating the website under analysis for further human or machine analysis.

Example 15 includes the method of example 1, wherein the phishing mitigation action comprises blocking the website under analysis.

Example 16 includes the method of example 1, wherein the phishing mitigation action comprises sending a warning message to a user.

Example 17 includes the method of example 1, wherein the usage counter is weighted according to a number of case-sensitive variations of a word or phrase that appear in the case-sensitive usage reference.

Example 18 includes the apparatus comprising means for performing the method of any of examples 1-17.

Example 19 includes the apparatus of example 18, wherein the means for performing the method comprise a processor and a memory.

Example 20 includes the apparatus of example 19, wherein the memory comprises machine-readable instructions that, when executed, cause the apparatus to perform the method of any of examples 1-17.

Example 21 includes the apparatus of any of examples 18-20, wherein the apparatus is a computing system.

Example 22 includes the least one computer readable medium comprising instructions that, when executed, implement a method or realize an apparatus as in any of examples 1-21.

Example 23 includes one or more tangible, nontransitory computer-readable media having stored thereon executable instructions to instruct a processor to: extract text from a website under analysis; spell check the extracted text against a language dictionary of words or phrases selected from known non-phishing websites, and accumulate misspell hits into a spelling counter; compare the spell-checked extracted text to a case-sensitive usage dictionary, and accumulate usage mismatches into a usage counter; based on a combination of the spelling counter and usage counter, identify the website under analysis as a suspected phishing website and take a phishing mitigation action.

Example 24 includes the one or more tangible, nontransitory computer-readable media of example 23, wherein the instructions are further to perform a pre-analysis collection phase, comprising selecting a set of web pages known to be phishing targets, collecting common words and phrases from the set of web pages, and building the language dictionary and case-sensitive usage dictionary.

Example 25 includes the one or more tangible, nontransitory computer-readable media of example 24, wherein building the language dictionary comprises building a histogram of most common words and phrases in the set of web pages.

Example 26 includes the one or more tangible, nontransitory computer-readable media of example 24, wherein the set of web pages comprises web pages determined to be most popular as phishing targets.

Example 27 includes the one or more tangible, nontransitory computer-readable media of example 24, wherein the set of web pages comprises pages from a domain that collect sensitive personal or financial data.

Example 28 includes the one or more tangible, nontransitory computer-readable media of example 23, wherein the spell check is case insensitive.

Example 29 includes the one or more tangible, nontransitory computer-readable media of example 23, wherein the spell check comprises symmetric delete.

Example 30 includes the one or more tangible, nontransitory computer-readable media of example 23, wherein the instructions are further to combine the spelling counter and the usage counter using a weighted sum.

Example 31 includes the one or more tangible, nontransitory computer-readable media of example 23, wherein the instructions are further to combine the spelling counter and the usage counter using a normalized sum.

Example 32 includes the one or more tangible, nontransitory computer-readable media of example 23, wherein identifying the website under analysis as a suspected phishing website comprises using a combined counter, combined from the spelling counter and the usage counter, as an input to a phishing analysis engine.

Example 33 includes the one or more tangible, nontransitory computer-readable media of example 23, wherein identifying the website under analysis as a suspected phishing website comprises using a combined counter, combined from the spelling counter and the usage counter, as an input to an artificial intelligence algorithm.

Example 34 includes the one or more tangible, nontransitory computer-readable media of example 23, wherein identifying the website under analysis as a suspected phishing website comprises determining that the website under analysis includes two or more misspellings.

Example 35 includes the one or more tangible, nontransitory computer-readable media of example 23, wherein identifying the website under analysis as a suspected phishing website comprises determining that the website under analysis includes one or more misspellings, and two or more usage mismatches.

Example 36 includes the one or more tangible, nontransitory computer-readable media of example 23, wherein the phishing mitigation action comprises decorating the website under analysis for further human or machine analysis.

Example 37 includes the one or more tangible, nontransitory computer-readable media of example 23, wherein the phishing mitigation action comprises blocking the website under analysis.

Example 38 includes the one or more tangible, nontransitory computer-readable media of example 23, wherein the phishing mitigation action comprises sending a warning message to a user.

Example 39 includes the one or more tangible, nontransitory computer-readable media of example 23, wherein the usage counter is weighted according to a number of case-sensitive variations of a word or phrase that appear in the case-sensitive usage dictionary.

Example 40 includes a computing ecosystem comprising one or more computing apparatus, comprising at least one processor circuit; a memory; and instructions stored within the memory to instruct the at least one processor circuit to: collect text from a user input form a website under analysis; spell check the collected text using a case-insensitive spell check algorithm with a language dictionary of words or phrases selected from user input forms of known non-phishing websites, and accumulate misspell hits into a spelling counter; compare the spell-checked extracted text to a case-sensitive usage dictionary, and accumulate usage mismatches into a usage counter; combine the spelling counter and the usage counter into a combined counter, and based on the combined counter, identify the website under analysis as a suspected phishing website and take a phishing mitigation action.

Example 41 includes the computing ecosystem of example 40, wherein the instructions are further to perform a pre-analysis collection phase, comprising selecting a set of web pages known to be phishing targets, collecting common words and phrases from the set of web pages, and building the language dictionary and case-sensitive usage dictionary.

Example 42 includes the computing ecosystem of example 41, wherein building the language dictionary comprises building a histogram of most common words and phrases in the set of web pages.

Example 43 includes the computing ecosystem of example 41, wherein the set of web pages comprises web pages determined to be most popular as phishing targets.

Example 44 includes the computing ecosystem of example 41, wherein the set of web pages comprises pages from a domain that collect sensitive personal or financial data.

Example 45 includes the computing ecosystem of example 40, wherein the case-insensitive spell check algorithm comprises symmetric delete.

Example 46 includes the computing ecosystem of example 40, wherein combining the spelling counter and the usage counter comprises a weighted sum.

Example 47 includes the computing ecosystem of example 40, wherein combining the spelling counter and the usage counter comprises computing a normalized sum.

Example 48 includes the computing ecosystem of example 40, wherein identifying the website under analysis as a suspected phishing website comprises using the combined counter as an input to a phishing analysis engine.

Example 49 computing ecosystem of example 40, wherein identifying the website under analysis as a suspected phishing website comprises using the combined counter as an input to an artificial intelligence algorithm.

Example 50 includes the computing ecosystem of example 40, wherein identifying the website under analysis as a suspected phishing website comprises determining that the website under analysis includes two or more misspellings.

Example 51 computing ecosystem of example 40, wherein identifying the website under analysis as a suspected phishing website comprises determining that the website under analysis includes one or more misspellings, and two or more usage mismatches.

Example 52 computing ecosystem of example 40, wherein the phishing mitigation action comprises decorating the website under analysis for further human or machine analysis.

Example 53 computing ecosystem of example 40, wherein the phishing mitigation action comprises blocking the website under analysis.

Example 54 computing ecosystem of example 40, wherein the phishing mitigation action comprises sending a warning message to a user.

Example 55 computing ecosystem of example 40, wherein the usage counter is weighted according to a number of case-sensitive variations of a word or phrase that appear in the case-sensitive usage dictionary.

DETAILED DESCRIPTION OF THE FIGURES

A system and method for phishing detection via grammatical artifacts will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of selected elements of a phishing mitigation ecosystem 100. In the example of FIG. 1, ecosystem 100 may be an enterprise, a small business, a charity, a government entity, a data center, a telecommunications provider, a "smart home" with computers, smart phones, and various internet of things (IoT) devices, or any other suitable ecosystem. Security ecosystem 100 is provided herein as an illustrative and nonlimiting example of a system that may employ, and benefit from, the teachings of the present specification.

Ecosystem 100 may include one or more protected enterprises 102. A single protected enterprise 102 is illustrated here for simplicity, and could be a business enterprise, a government entity, a family, a nonprofit organization, a church, or any other organization that may subscribe to security services provided, for example, by security services provider 190.

Within security ecosystem 100, one or more users 120 operate one or more client devices 110. A single user 120 with multiple client devices 110 are illustrated here for simplicity, but a home or enterprise may have multiple users, each of which may have multiple devices, such as desktop computers, laptop computers, smart phones, tablets, hybrids, or similar. Client devices 110 may include one or more web browsers 112, which user 120 may use to access websites and other network-based resources.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the internet. Local network 170 may also provide access to an external network, such as the internet, via external network 172. External network 172 may similarly be any suitable type of network.

Local network 170 may connect to the internet via gateway 108, which may be responsible, among other things, for providing a logical boundary between local network 170 and external network 172. Local network 170 may also provide services such as dynamic host configuration protocol (DHCP), network address translation (NAT), gateway services, router services, and switching services, and may act as a security portal across local boundary 104.

In some embodiments, gateway 108 may be a simple home router, or may be a sophisticated enterprise infrastructure including routers, gateways, firewalls, security services, deep packet inspection, web servers, or other services.

In further embodiments, gateway 108 may be a standalone internet appliance. Such embodiments are popular in cases in which ecosystem 100 includes a home or small business. In other cases, gateway 108 may run as a virtual machine or in another virtualized manner. In larger enterprises that features service function chaining (SFC) or NFV, gateway 108 may be include one or more service functions and/or virtualized network functions.

Local network 170 may also include other devices 140, which may include devices operated by other users, Internet of Things (IoT) devices, smart home devices, printers, infrastructure, and other network connected devices.

Local network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to local network 170, such as security software, security updates, network appliances, or similar. For example, MCAFEE, LLC provides a comprehensive suite of security services that may be used to protect local network 170 and the various devices connected to it.

User 120 may operate devices 110 to access web resources, including for example a legitimate website 160 provided by a legitimate enterprise 162. In some cases, enterprise 162 may operate services such as banking, asset trading, exchanges, ecommerce, social media, or other services. These services may, by nature, involve personally identifying information (PII), financial data, credit cards, social security numbers, or other sensitive information associated with user 120. Enterprise 162 may use these data for legitimate business purposes that user 120 considers beneficial.

An attacker 180 may intend to compromise the security, privacy, or data integrity of user 120, or of enterprise 102. To this end, attacker 180 may operate a phishing website 182. Phishing website 182 may commonly be designed to mimic features of legitimate website 160, such as by providing a similar layout, graphics, interfaces, colors, logos, and other elements that makes phishing website 182 appear to be a legitimate website of enterprise 162. The intent of phishing website 182 may be to deceive user 120 into disclosing to attacker 180 sensitive information, such as information that user 120 may use to operate or interact with legitimate website 160.

Attacker 180 may use these data to steal money, information, passwords, or other useful content from user 120. Attacker 180 may use these data to enrich himself or herself at the expense of user 120 and/or enterprise 102. In enterprise contexts, attacker 180 may also want to commit industrial or other espionage, such as stealing classified or proprietary data, stealing identities, or gaining unauthorized access to enterprise resources.

Protected enterprise 102 may contract with or subscribe to a security services provider 190, which may provide security services, updates, antivirus definitions, patches, products, and services, including phishing mitigation. MCAFEE, LLC is a nonlimiting example of such a security services provider that offers comprehensive security and antivirus solutions. In some cases, security services provider 190 may include a threat intelligence service 192 such as the global threat intelligence (GTI™) database provided by MCAFEE, LLC, or similar competing products. Threat intelligence services are useful in the phishing context because they may include a database of known URLs, and associated reputation for each, including indications of which URLs are known to host phishing content. Security services provider 190 may update its threat intelligence database by analyzing new candidate websites as they appear on the internet and categorizing them as "safe" or "malicious" (or similar). A threat intelligence database may also classify websites, including non-phishing websites, according to the type of content they offer.

Other security considerations within ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

Figure 2:
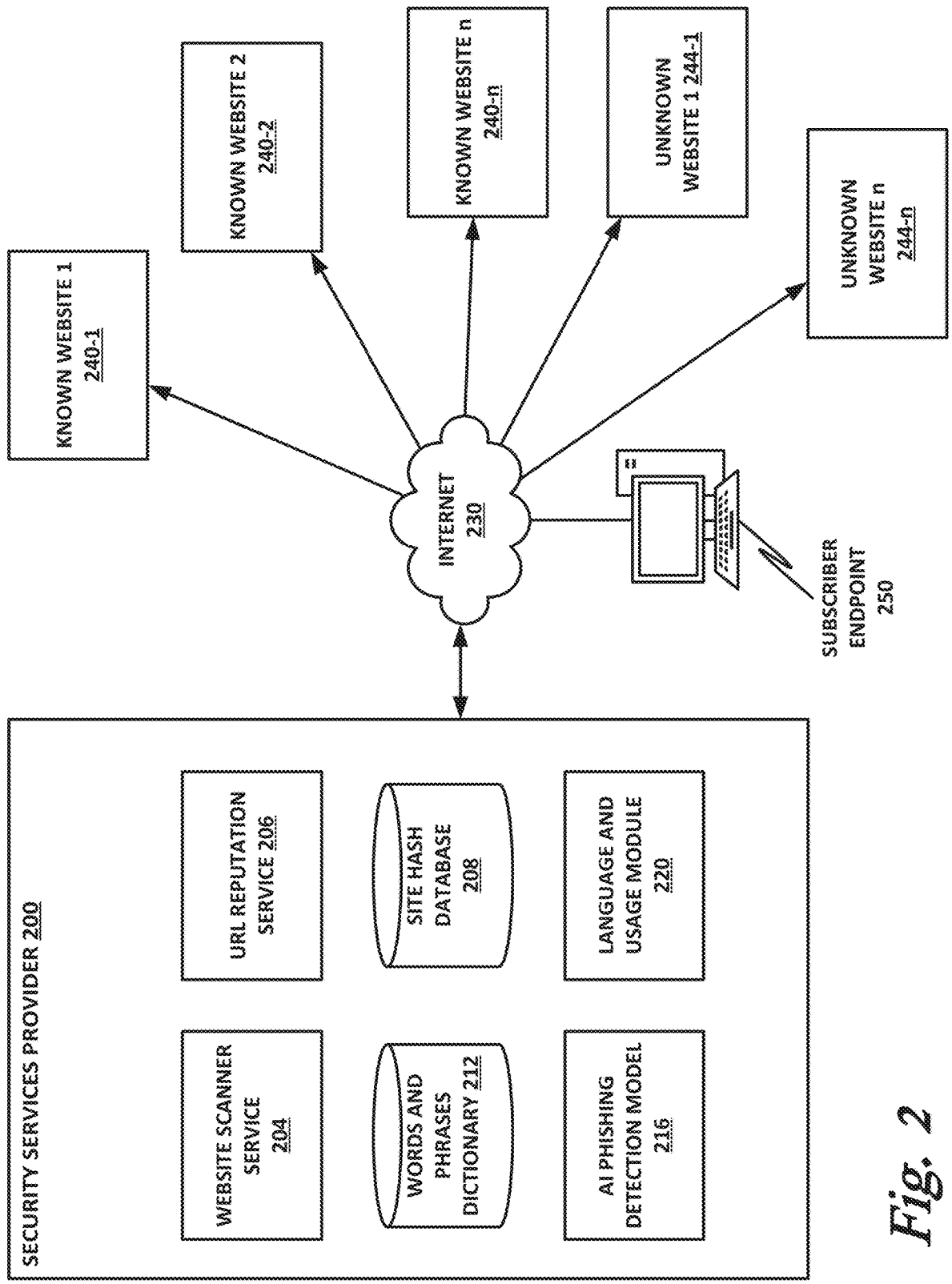
FIG. 2 is a block diagram of further selected elements of a security services ecosystem.

FIG. 2 is a block diagram of selected elements of a security services provider 200. In this example, security services provider 200 may include a cloud service, a data center, or other appropriate infrastructure.

Security services provider 200 communicates with a subscriber endpoint 250 via internet 230. Subscriber endpoint 250 may wish to access certain websites such as known website 1 240-1, known website 2 240-2, through known website n 240-n. Known websites 240 may be legitimate websites that security services provider 200 has already verified as providing a legitimate service. However, subscriber endpoint 250 may also wish to access unknown website 1 244-1 through unknown website n 244-n. Unknown websites 244 may be legitimate websites that have not yet received a reputation from security services provider 200, or they may be illegitimate websites such as phishing websites. Subscriber endpoint 250 may include a security agent, and the subscriber may contract with security services provider 200 to provide protection to one or more endpoints 250.

Within security services provider 200, the infrastructure may provide a number of modules. These modules may be, for example, virtual machines, containers, standalone servers, accelerators, or other similar architecture that provides the illustrated services. The disclosure of certain blocks here does not imply a particular required structure. Two or more blocks may be provided by the same machine, virtual machine, or service. In other embodiments a plurality of machines, virtual machines, or services may provide a single module.

A website scanner service 204 may scan unknown websites 244 to assign them reputations based on their characteristics. This may include a URL reputation service 206, which may include a database of known URLs with reputations assigned to the known URLs. Thus, for example, if website scanner service 204 scans unknown website 1 244-1 and determines that it is visually similar to known website 1 240-1, but also determines that the URL of unknown website 1 244-1 does not belong to the operator of known website 1 240-1, then website scanner service 204 may determine that unknown website 1 244-1 is suspicious. Website scanner service 204 may also provide other features, such as a neural network, fixed algorithms, pattern matching, and other utilities to scan unknown websites.

Security services provider 200 may also have a website hash database 208. This may include, for example, a hash of the visual elements of known websites 240, which can be compared to unknown websites 244. If an unknown website 244 matches a hash for a known website 240, but unknown website 244 is hosted at a URL not owned by the operator of the known website 240, then this behavior may be deemed suspicious.

As part of website scanning service 204, security services provider 200 may provide an artificial intelligence (AI) phishing detection model 216, which scans unknown websites visually for language artifacts, and for other features to assign a probability that the websites are phishing websites. One input to AI phishing detection model 216 may be a language and usage module 220. Language and usage module 220 may scan known websites 240 to create a words-and-phrases language dictionary 212. This may be a catalog of the x most common words and phrases that appear on known legitimate websites. It is expected that words and phrases dictionary 212 may include such phrases as "password," "sign in," "create an account," "forgot password," "username," "email," "phone number," and other similar words and phrases that commonly appear on legitimate websites. Language and usage module 220 may scan known websites 240 to create words and phrases dictionary 212, which is then prepared for use in detection.

While the initial scanning (e.g., stage 1) commonly may occur in the cloud, detection may occur in the cloud or on the individual endpoint. For example, a pre-trained AI phishing detection model 216 may be provided to subscriber endpoint 250, along with a words and phrases dictionary 212. Security services provider 200 may update these periodically on subscriber endpoint 250 as part of its ordinary update process, which may also include updated antivirus definitions and other features. In that case, subscriber endpoint 250 may operate its own security agent and scan an unknown website 244 when it is first encountered.

Additionally, or in the alternative, a security agent may be hosted on security services provider 200, such as in the cloud, and may scan websites as they are encountered. Subscriber endpoint 250 may then query security services provider 200 for information about the URL when endpoint 250 encounters an unknown website 244. Security services provider 200 may then provide a reputation to subscriber endpoint 250.

Figure 3:
FIG. 3 is a graph of an illustrative language dictionary.

FIG. 3 is a graph of an illustrative language dictionary 300. Language dictionary 300 may include words that have been identified as commonly occurring on legitimate websites.

Each word or phrase is case sensitive, and may also be sensitive to features such as spaces versus hyphens. In this example, the words and phrases are ranked by frequency. Each word or phrase is assigned a case sensitivity correction weight. This weight may be applied to a counter when the word or phrase is encountered on an unknown website. For example, there are three variations of the phrase "Sign In." In addition to this form, variations include "Sign in" and "Sign-in." Because there are three variations of this phrase that appear in legitimate websites, each occurrence in a case sensitivity scan is weighted by ⅓ or 0.33. Similarly, the word "password" occurs in two different forms, namely "password" and "Password." This word is weighted by 0.5.

Figure 4:
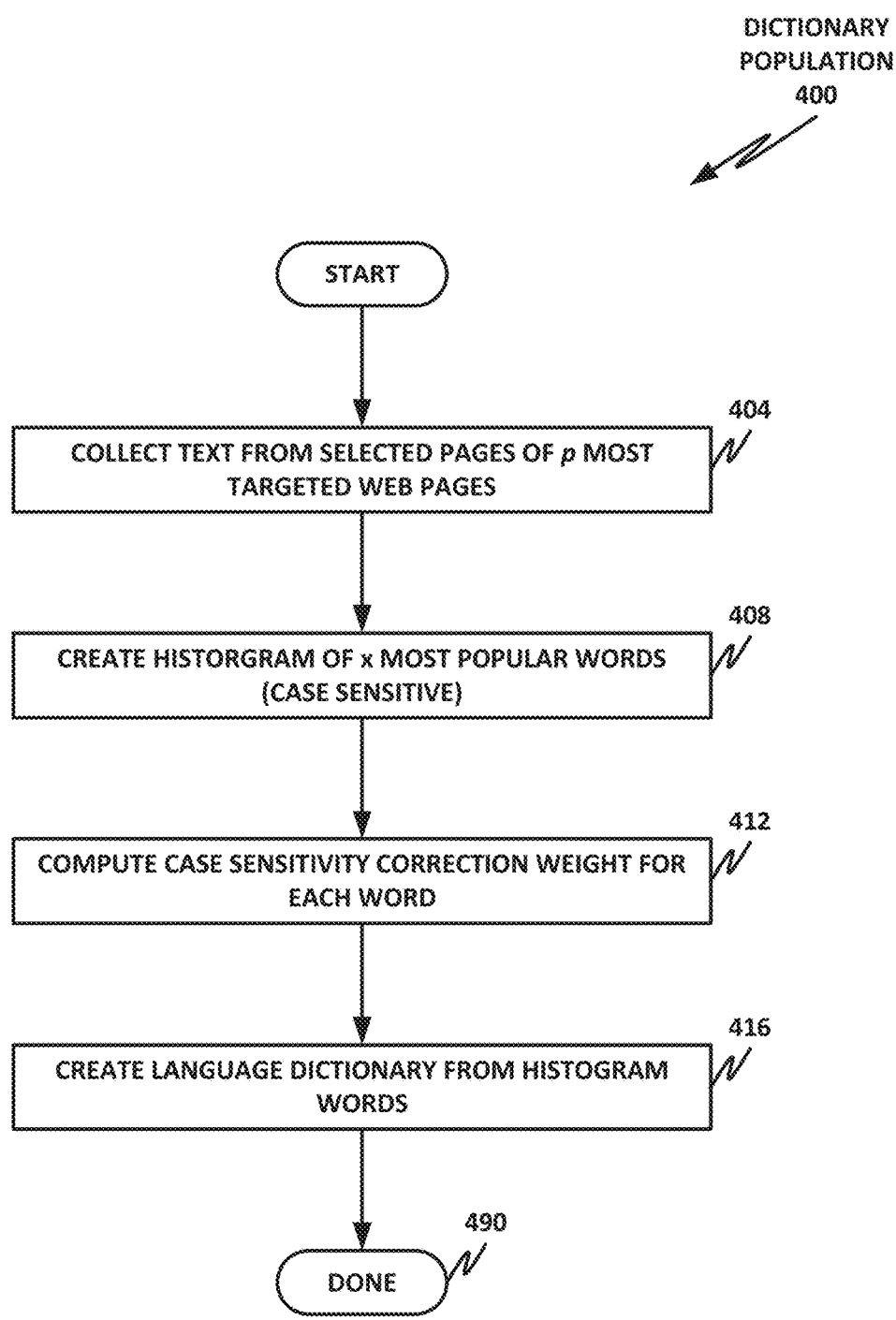
FIG. 4 is a flowchart of a dictionary population method.

FIG. 4 is a flowchart of a dictionary population method 400. Method 400 may be performed as the first stage of a two-stage procedure. The first stage is to prepare a language dictionary for use in later stages of detection.

In block 404 the system collects text from selected webpages. These may be identified as a number of targeted webpages, such as the p most commonly targeted websites for phishing. This may include popular websites for banking, e-commerce, subscriptions, or other similar websites, and in particular websites that collect personal and sensitive information and financial information. Note that this scan need not be targeted to the entire website, but may be limited to those portions of the website that are targets for phishing, in particular the entry of usernames, passwords, or other information that may be culled by phishing attackers.

In block 408 the system creates a histogram of the x most popular words from these websites. The histogram may include the x most popular words collected from the login and data entry pages of the popular websites. As illustrated previously, the histogram of most popular words may be case sensitive, may include short phrases (and in particular, nuclear phrases), and may include variations of words or phrases with different capitalization, spelling, hyphenation, spacing, or other variations.

In block 412 the system may compute the case sensitivity correction weight for each word. As illustrated above, if a word appears multiple times, then the entry may be weighted according to the number of variations of the word. If there are n variations, then the weight may be computed, for example, as 1/n, and applied to each of the n instances. Other weighting algorithms could also be used.

In block 416 the system creates a language dictionary from the histogram of words collected in this stage. This language dictionary may be stored in a local database, and optionally may also be exported to endpoints or clients for use in local detection.

In block 490 the method is done.

Figure 5:
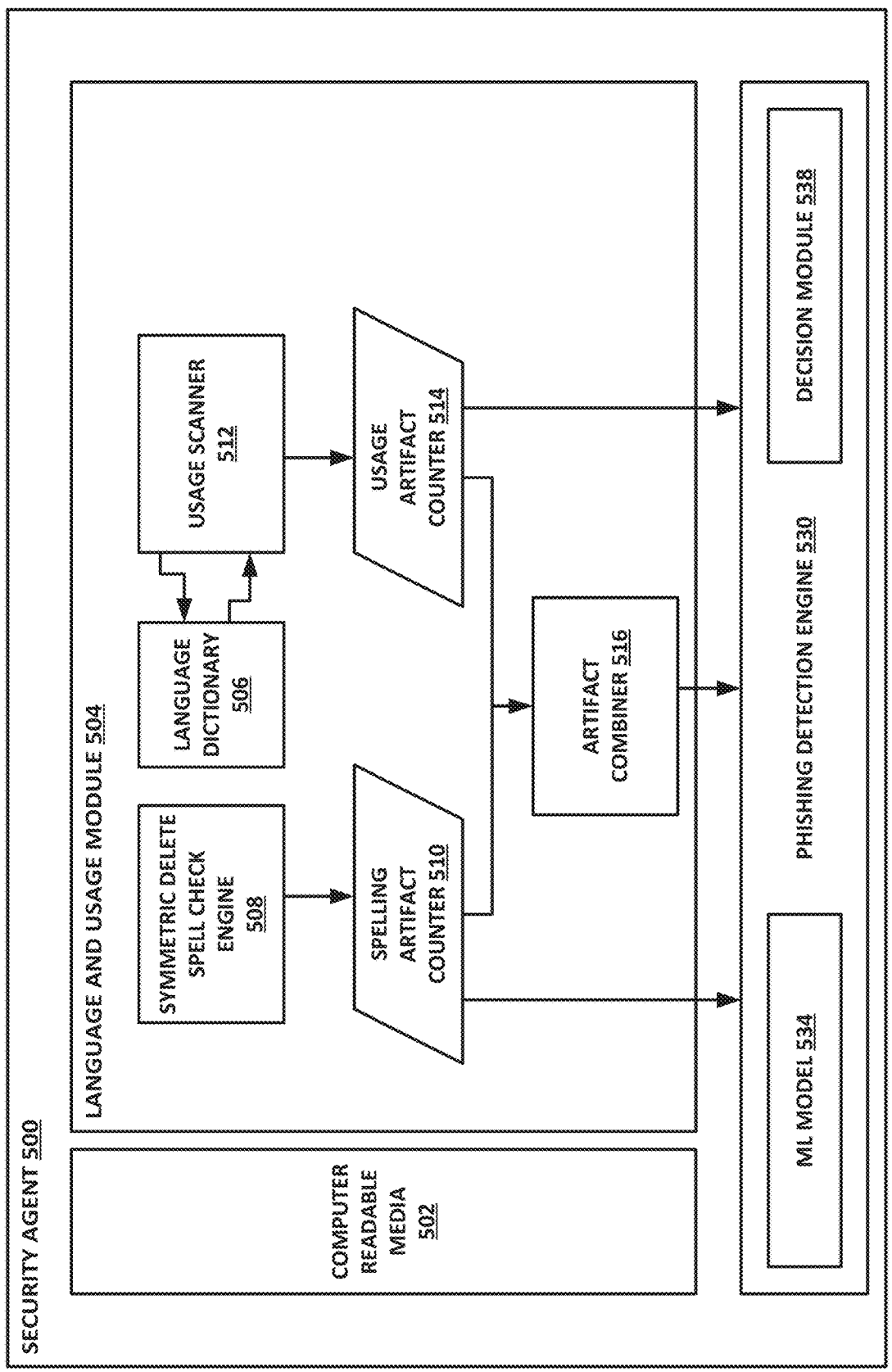
FIG. 5 is a block diagram of selected elements of a security agent.

FIG. 5 is a block diagram of selected elements of a security agent 500. Security agent 500 may include one or more computer readable media 502, which may have stored thereon executable instructions for carrying out certain operations. Security agent 500 includes a language and usage model 504. Language and usage model 504 provides a symmetric delete spell check engine 508. Symmetric delete spell check engine 508 may carry out a traditional spell check function such as the Damerau-Levenshtein distance for measuring the edit distance between two sequences:

$$f_{a,b}(i, j) = \min \begin{cases} 0 & \text{if } i = j = 0 \\ f_{a,b}(i-1, j) + 1 & \text{if } i > 0 \\ f_{a,b}(i-1, j) + 1 & \text{if } i > 0 \\ f_{a,b}(i-1, j-1) + 1 & \\ (a_i \text{ and } b_j \text{ are not equal}) & \text{if } i, j > 0 \\ f_{a,b}(i-2, j-2) + 1 & \text{if } i, j > 0 \text{ and } a_{i-1} = b_{j-1} \end{cases}$$

As symmetric delete spell check engine 508 scans a website under analysis, it may keep a counter such as spelling artifact counter 510. Spelling artifact counter 510 may in some embodiments keep a straight count of the number of spelling errors found in the website.

Security agent 500 may also include a usage scanner 512. Usage scanner 512 checks for usage, and in particular performs a case-sensitive detection on the website. This includes looking for words or phrases in language dictionary 506 that are spelled correctly, but have unusual capitalization. Usage scanner 512 may keep a count in usage artifact counter 514. This may be a straight count, or it may be a weighted count according to weights provided in language dictionary 506.

An artifact combiner 516 may receive spelling artifact counter 510 and usage artifact counter 514, and may combine them according to an algorithm, which may be any suitable function of the two counters.

Security agent 500 may also include a phishing detection engine 530. Phishing detection engine 530 may receive one or more of the unmodified spelling artifact counter 510, the unmodified usage artifact counter 514, or artifact combiner 516. Phishing detection engine 530 may use one, two, or all three of these inputs within decision module 538. Decision module 538 may compare the artifacts to a threshold to convict a website as phishing or as suspicious.

For example, a single spelling mistake within a website is highly suspicious because legitimate websites for large organizations are professionally copyedited and generally have few, if any, spelling errors. Two or more spelling errors may provide very high confidence that the website is a phishing website, and in that case further analysis may not be necessary. In other embodiments, a single spelling error combined with a plurality of artifact errors may also cause a detection. For example, one spelling error and two or more capitalization irregularities may convict a website as suspicious.

In the same or a different embodiment, an ML model 534 may analyze a website according to other features, such as visually, textually, graphically, or otherwise. This may also include analyzing the URL or associated get codes. ML model 534 may receive the spelling artifact counter, the usage artifact counter, or the combined counter. It may use one, two, or all three of these as a feature in its ML model, which may be used for example to convict the website with high confidence. ML model 534 may provide an identification of the website as malicious or benign, along with an associated confidence. Decision module 538 may then use the assignment and the confidence to determine which actions, if any, to take against the website.

Figure 6A:
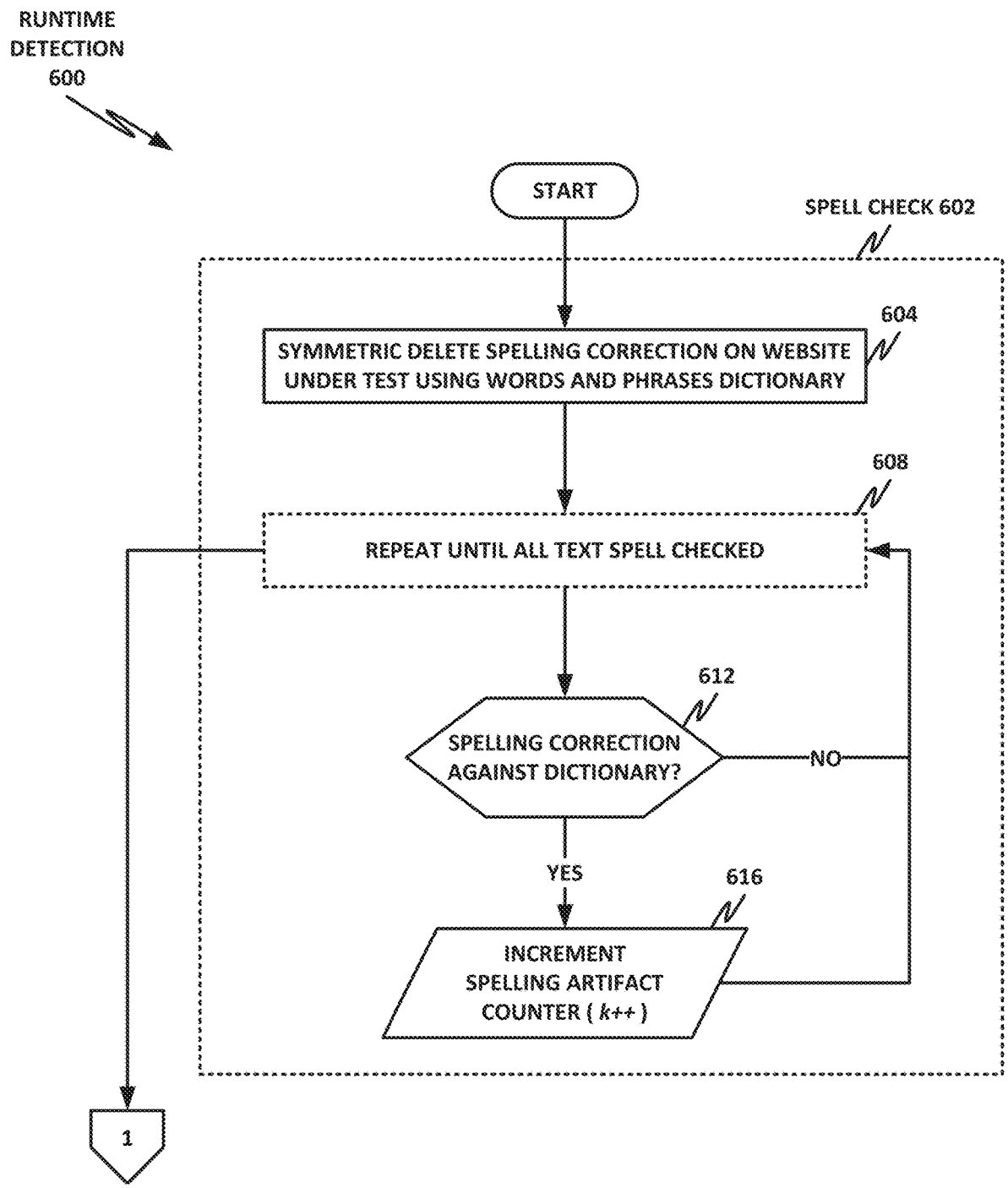
FIGS. 6A and 6B are a flowchart of a runtime detection method.
Figure 6B:
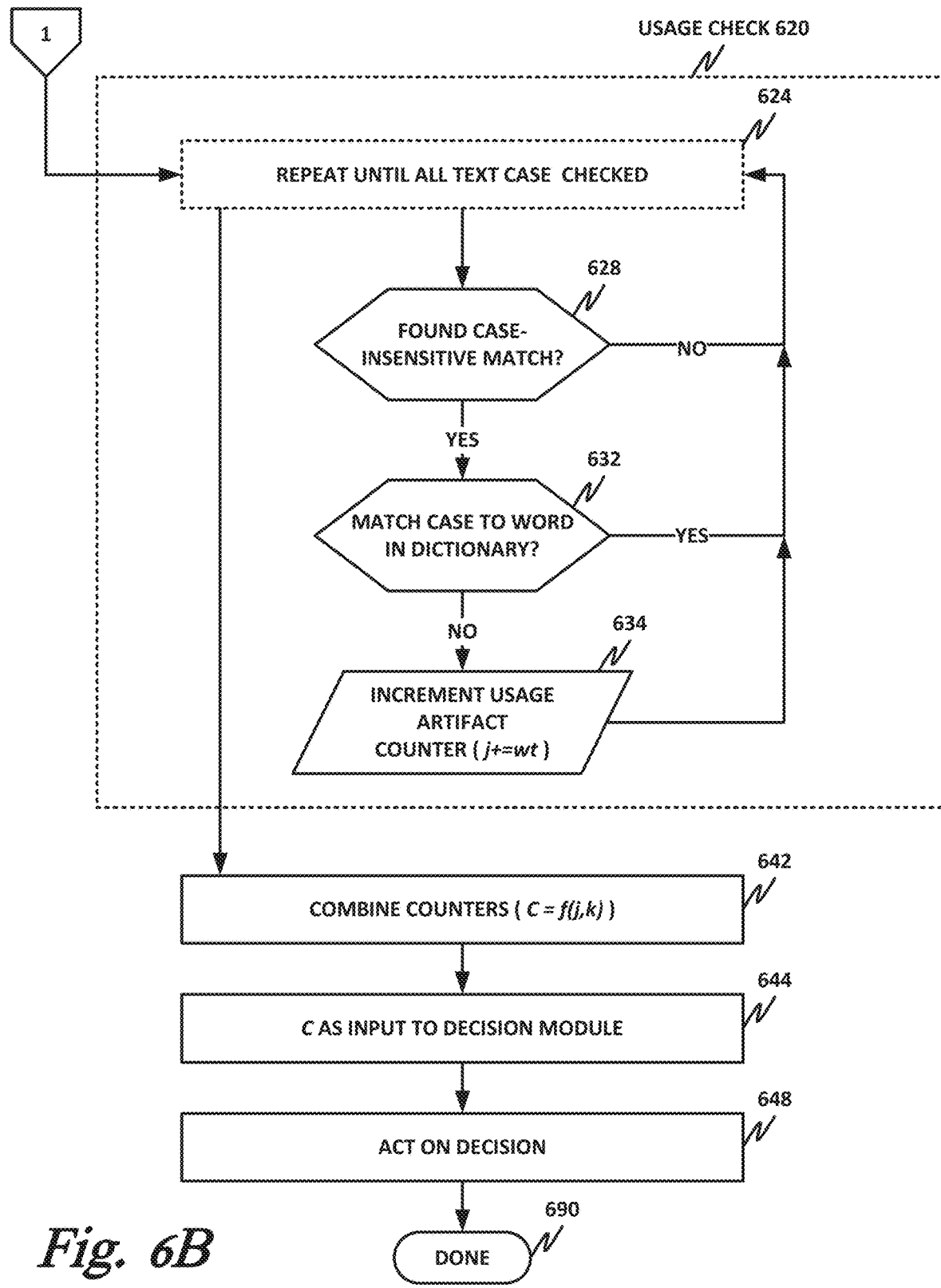

FIGS. 6A and 6B are a flowchart of a runtime detection method 600. Runtime detection method 600 may be performed, for example, by security agent 500 of FIG. 5, or by any other appropriate module. Runtime detection is the second stage of the two-stage method, and here is divided into two subphases, namely a spell check phase 602 and a usage check phase 620.

Beginning in FIG. 6A, within spell check phase 602 at block 604, the system or the module may initially perform a symmetric delete spelling correction on the website under test using its words and phrases dictionary. This may be, for example, words and phrases dictionary 212 of FIG. 2, as determined within or provided by a security services vendor.

Block 608 represents a method that is repeated until all text has been spell checked. In decision block 612, the module checks whether a spelling correction is found against the dictionary. If no spelling correction is found, then control returns to block 608 and the next word is checked.

In block 612, if a spelling correction is found against the dictionary, then in block 616 the module increments the spelling artifact counter (e.g., k++). After incrementing the counter, control returns to block 608, and the spell check is repeated until all words under analysis have been checked.

After all words have been checked, then control follows off-page connector 1 to FIG. 6B.

Turning to FIG. 6B, within the usage check phase 620, at block 624 is an entry point to a process that is repeated until all text case checks have been performed.

In block 628, the module first determines whether a case insensitive match is found to a word in the words and phrases dictionary. If no case insensitive match is found, then control returns to block 624 to check the next word.

If in block 628 a case insensitive match is found, then in decision block 632 the module checks to determine whether the usage matches the case to a word in the dictionary. Note that if there are multiple versions of the word, then this may require checking against all versions. For example, any case insensitive match to "password" may be matched against both "password" and "Password." If the word or phrase under analysis matches one of the cases or usages within the words and phrases dictionary, then no further action is required and control returns to block 624.

If in block 632 the word under analysis does not match to one of the known usages, then in block 634 the module may increment the usage artifact counter (e.g., j+=wt), where wt is a weighted sum depending on the number of variations of the word in the usage dictionary. This weighting represents a recognition that the more variations of a word there are, the more likely it is that an unusual usage may be encountered on a legitimate website.

After the usage artifact counter has been incremented, control returns to block 624 and the method repeats until all words that had a spelling match have been checked for a usage match. Once all words have been checked, in block 642 the module combines the two counters j and k. For example, C=f(j,k). This combination may be a simple sum of j and k, a product, a weighted sum, or some other combining function. The combination may optionally be normalized (e.g., to between 0 and 1).

In block 644 the module provides C as an input to a decision module, which will decide how to act on the information. The decision module may act on the bare counters, or may provide the counters as an input to a different algorithm, such as a neural network or a fixed algorithm.

In block 648, according to the decision provided by the decision module, the system may act on the decision. This may include, for example, blocking the website, providing a warning to the user, adding the website to a green list (e.g., known good websites), a yellow list (e.g., unknown or suspicious websites), or a red list (e.g., known bad or blocked websites).

In block 690 the method is done.

Figure 7:
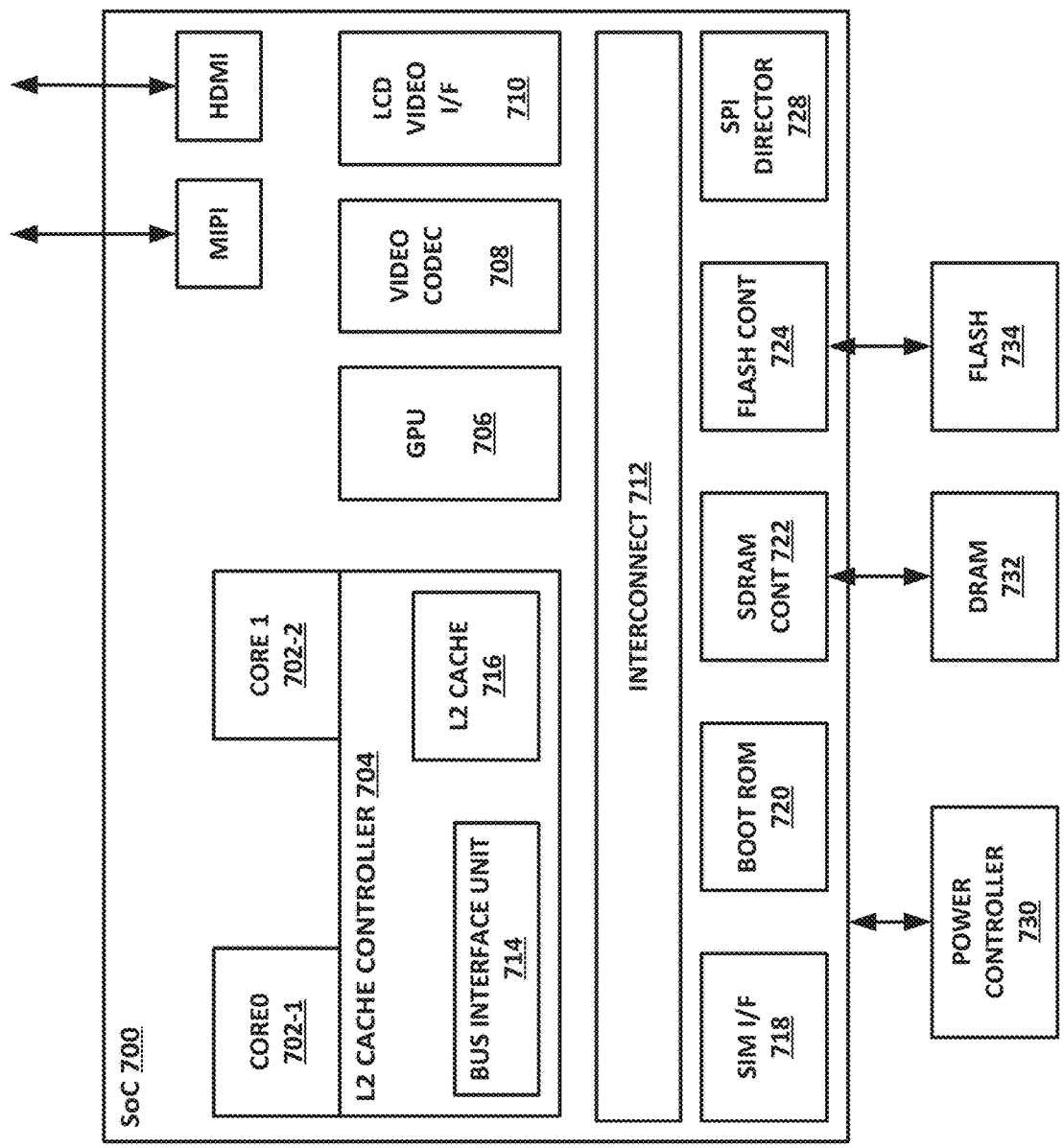
FIG. 7 is a block diagram of selected elements of a system-on-a-chip (SoC).

FIG. 7 is a block illustrating selected elements of an example SoC 700. In at least some embodiments, SoC 700 may be configured or adapted to provide phishing detection via grammatical artifacts, according to the teachings of the present specification.

At least some of the teachings of the present specification may be embodied on an SoC 700, or may be paired with an SoC 700. SoC 700 may include, or may be paired with, an advanced reduced instruction set computer machine (ARM) component. For example, SoC 700 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 700 could also be integrated into, for example, a personal computer, server, video processing components, laptop computer, notebook computer, netbook, or touch-enabled device.

As with hardware platform QB00 above, SoC 700 may include multiple cores 702-1 and 702-2. In this illustrative example, SoC 700 also includes an L2 cache control 704, a graphics processing unit (GPU) 706, a video codec 708, a liquid crystal display (LCD) I/F 710 and an interconnect 712. L2 cache control 704 can include a bus interface unit 714, a L2 cache 716. Liquid crystal display (LCD) I/F 710 may be associated with mobile industry processor interface (MIPI)/high-definition multimedia interface (HDMI) links that couple to an LCD.

SoC 700 may also include a subscriber identity module (SIM) I/F 718, a boot read-only memory (ROM) 720, a synchronous dynamic random-access memory (SDRAM) controller 722, a flash controller 724, a serial peripheral interface (SPI) director 728, a suitable power control 730, a dynamic RAM (DRAM) 732, and flash 734. In addition, one or more embodiments include one or more communication capabilities, interfaces, and features such as instances of Bluetooth, a 3G modem, a global positioning system (GPS), and an 802.11 Wi-Fi.

Designers of integrated circuits such as SoC 700 (or other integrated circuits) may use intellectual property (IP) blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a nonvolatile memory (NVM) controller, Wi-Fi, Bluetooth, GPS, a fourth or fifth-generation network (4G or 5G), an audio processor, a video processor, an image processor, a graphics engine, a graphics processing unit (GPU) engine, a security controller, and many other IP blocks. In many cases, each of these IP blocks has its own embedded microcontroller.

Figure 8:
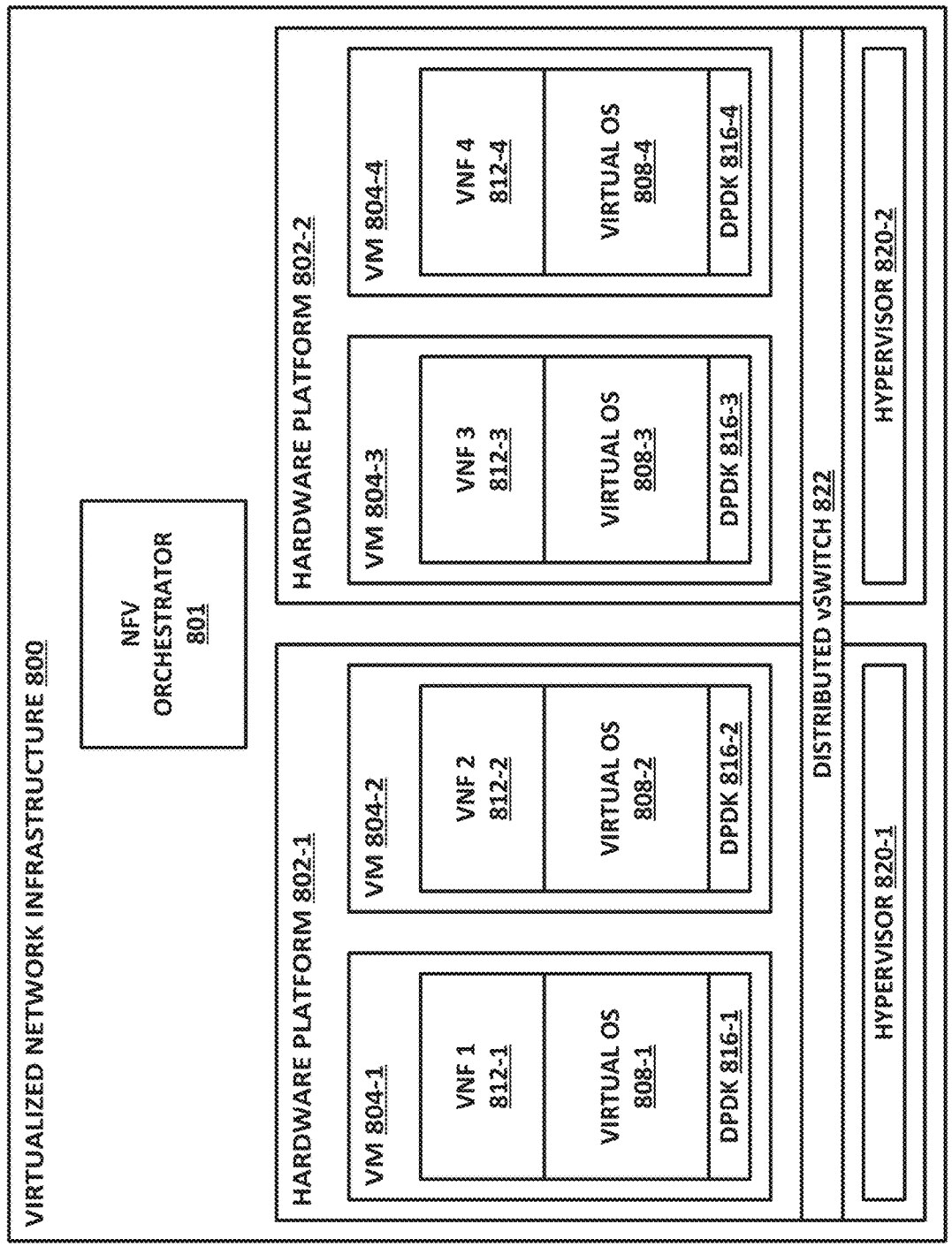
FIG. 8 is a block diagram of selected elements of a network function virtualization (NFV) infrastructure.

FIG. 8 is a block diagram of a network function virtualization (NFV) infrastructure 800. A virtualization infrastructure such as the one illustrated in FIG. 8 could be used in conjunction with embodiments of this disclosure.

NFV is an aspect of network virtualization that is generally considered distinct from, but that can still interoperate with, SDN. For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, virtual network functions (VNFs) can be provisioned ("spun up") or removed ("spun down") to meet network demands. For example, in times of high load, more load balancing VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 800. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 8, an NFV orchestrator 801 manages a number of the VNFs 812 running on an NFVI 800. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 801 a valuable system resource. Note that NFV orchestrator 801 may provide a browser-based or graphical configuration n interface, and in some embodiments may be integrated with SDN orchestration functions.

Note that NFV orchestrator 801 itself may be virtualized (rather than a special-purpose hardware appliance). NFV orchestrator 801 may be integrated within an existing SDN system, wherein an operations support system (OSS) manages the SDN. This may interact with cloud resource management systems (e.g., OpenStack) to provide NFV orchestration. An NFVI 800 may include the hardware, software, and other infrastructure to enable VNFs to run. This may include a hardware platform 802 on which one or more VMs 804 may run. For example, hardware platform 802-1 in this example runs VMs 804-1 and 804-2. Hardware platform 802-2 runs VMs 804-3 and 804-4. Each hardware platform may include a hypervisor 820, virtual machine manager (VMM), or similar function, which may include and run on a native (bare metal) operating system, which may be minimal so as to consume very few resources.

Hardware platforms 802 may be or comprise a rack or several racks of blade or slot servers (including, e.g., processors, memory, and storage), one or more data centers, other hardware resources distributed across one or more geographic locations, hardware switches, or network interfaces. An NFVI 800 may also include the software architecture that enables hypervisors to run and be managed by NFV orchestrator 801.

Running on NFVI 800 are a number of VMS 804, each of which in this example is a VNF providing a virtual service appliance. Each VM 804 in this example includes an instance of the Data Plane Development Kit (DPDK), a virtual operating system 808, and an application providing the VNF 812.

Virtualized network functions could include, as nonlimiting and illustrative examples, firewalls, intrusion detection systems, load balancers, routers, session border controllers, deep packet inspection (DPI) services, network address translation (NAT) modules, or call security association.

The illustration of FIG. 8 shows that a number of VNFs 804 have been provisioned and exist within NFVI 800. This FIGURE does not necessarily illustrate any relationship between the VNFs and the larger network, or the packet flows that NFVI 800 may employ.

The illustrated DPDK instances 816 provide a set of highly-optimized libraries for communicating across a virtual switch (vSwitch) 822. Like VMs 804, vSwitch 822 is provisioned and allocated by a hypervisor 820. The hypervisor uses a network interface to connect the hardware platform to the data center fabric (e.g., an HFI). This HFI may be shared by all VMs 804 running on a hardware platform 802. Thus, a vSwitch may be allocated to switch traffic between VMs 804. The vSwitch may be a pure software vSwitch (e.g., a shared memory vSwitch), which may be optimized so that data are not moved between memory locations, but rather, the data may stay in one place, and pointers may be passed between VMs 804 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 822 is illustrated, wherein vSwitch 822 is shared between two or more physical hardware platforms 802.

Figure 9:
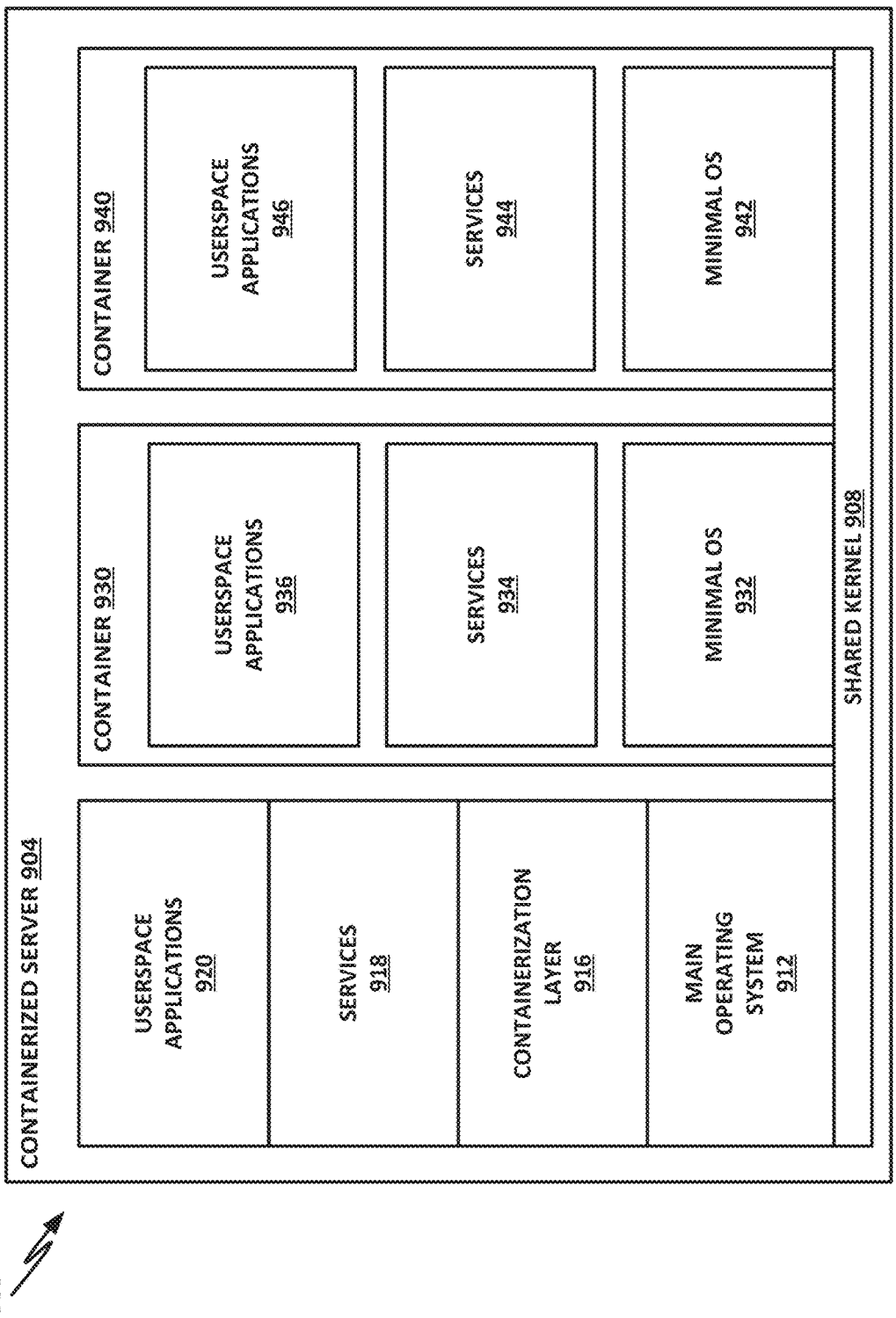
FIG. 9 is a block diagram of selected elements of a containerization infrastructure.

FIG. 9 is a block diagram of selected elements of a containerization infrastructure 900. A containerization infrastructure such as the one illustrated in FIG. 9 could be used in conjunction with embodiments of this disclosure, such as in cloud services. Like virtualization, containerization is a popular form of providing a guest infrastructure.

Containerization infrastructure 900 runs on a hardware platform such as containerized server 904. Containerized server 904 may provide a number of processors, memory, one or more network interfaces, accelerators, and/or other hardware resources.

Running on containerized server 904 is a shared kernel 908. One distinction between containerization and virtualization is that containers run on a common kernel with the main operating system and with each other. In contrast, in virtualization, the processor and other hardware resources are abstracted or virtualized, and each virtual machine provides its own kernel on the virtualized hardware.

Running on shared kernel 908 is main operating system 912. Commonly, main operating system 912 is a Unix or Linux-based operating system, although containerization infrastructure is also available for other types of systems, including Microsoft Windows systems and Macintosh systems. Running on top of main operating system 912 is a containerization layer 916. For example, Docker is a popular containerization layer that runs on a number of operating systems, and relies on the Docker daemon. Newer operating systems (including Fedora Linux 32 and later) that use version 2 of the kernel control groups service (cgroups v2) feature appear to be incompatible with the Docker daemon. Thus, these systems may run with an alternative known as Podman that provides a containerization layer without a daemon.

Various factions debate the advantages and/or disadvantages of using a daemon-based containerization layer versus one without a daemon, like Podman. Such debates are outside the scope of the present specification, and when the present specification speaks of containerization, it is intended to include containerization layers, whether or not they require the use of a daemon.

Main operating system 912 may also include a number of services 918, which provide services and interprocess communication to userspace applications 920.

Services 918 and userspace applications 920 in this illustration are independent of any container.

As discussed above, a difference between containerization and virtualization is that containerization relies on a shared kernel. However, to maintain virtualization-like segregation, containers do not share interprocess communications, services, or many other resources. Some sharing of resources between containers can be approximated by permitting containers to map their internal file systems to a common mount point on the external file system. Because containers have a shared kernel with the main operating system 912, they inherit the same file and resource access permissions as those provided by shared kernel 908. For example, one popular application for containers is to run a plurality of web servers on the same physical hardware. The Docker daemon provides a shared socket, docker.sock, that is accessible by containers running under the same Docker daemon. Thus, one container can be configured to provide only a reverse proxy for mapping hypertext transfer protocol (HTTP) and hypertext transfer protocol secure (HTTPS) requests to various containers. This reverse proxy container can listen on docker.sock for newly spun-up containers. When a container spins up that meets certain criteria, such as by specifying a listening port and/or virtual host, the reverse proxy can map HTTP or HTTPS requests to the specified virtual host to the designated virtual port. Thus, only the reverse proxy host may listen on ports 80 and 443, and any request to subdomain1.example.com may be directed to a virtual port on a first container, while requests to subdomain2.example.com may be directed to a virtual port on a second container.

Other than this limited sharing of files or resources, which generally is explicitly configured by an administrator of containerized server 904, the containers themselves are completely isolated from one another. However, because they share the same kernel, it is relatively easier to dynamically allocate compute resources such as CPU time and memory to the various containers. Furthermore, it is common practice to provide only a minimum set of services on a specific container, and the container does not need to include a full bootstrap loader because it shares the kernel with a containerization host (i.e., containerized server 904).

Thus, "spinning up" a container is often relatively faster than spinning up a new virtual machine that provides a similar service. Furthermore, a containerization host does not need to virtualize hardware resources, so containers access those resources natively and directly. While this provides some theoretical advantages over virtualization, modern hypervisors-especially type 1, or "bare metal," hypervisors-provide such near-native performance that this advantage may not always be realized.

In this example, containerized server 904 hosts two containers, namely container 930 and container 940.

Container 930 may include a minimal operating system 932 that runs on top of shared kernel 908. Note that a minimal operating system is provided as an illustrative example, and is not mandatory. In fact, container 930 may perform as full an operating system as is necessary or desirable. Minimal operating system 932 is used here as an example simply to illustrate that in common practice, the minimal operating system necessary to support the function of the container (which in common practice, is a single or monolithic function) is provided.

On top of minimal operating system 932, container 930 may provide one or more services 934. Finally, on top of services 934, container 930 may also provide a number of userspace applications 936, as necessary.

Container 940 may include a minimal operating system 942 that runs on top of shared kernel 908. Note that a minimal operating system is provided as an illustrative example, and is not mandatory. In fact, container 940 may perform as full an operating system as is necessary or desirable. Minimal operating system 942 is used here as an example simply to illustrate that in common practice, the minimal operating system necessary to support the function of the container (which in common practice, is a single or monolithic function) is provided.

On top of minimal operating system 942, container 940 may provide one or more services 944. Finally, on top of services 944, container 940 may also provide a number of userspace applications 946, as necessary.

Using containerization layer 916, containerized server 904 may run a number of discrete containers, each one providing the minimal operating system and/or services necessary to provide a particular function. For example, containerized server 904 could include a mail server, a web server, a secure shell server, a file server, a weblog, a database server, and many other types of services. In theory, these could all be provided in a single container, but security and modularity advantages are realized by providing each of these discrete functions in a discrete container with its own minimal operating system necessary to provide those services.

Figure 10:
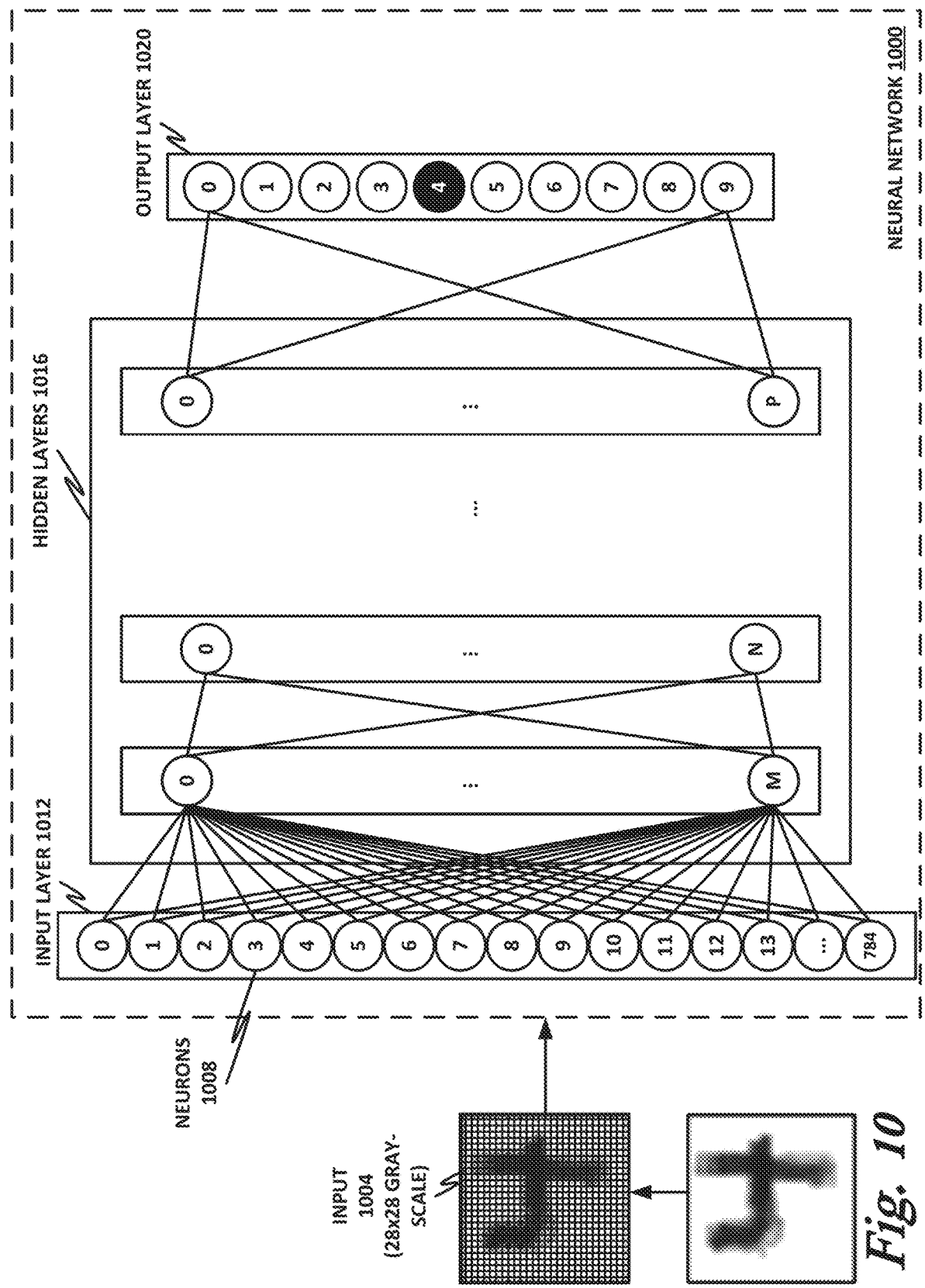
FIG. 10 illustrates machine learning according to a "textbook" problem with real-world applications.
Figure 11:
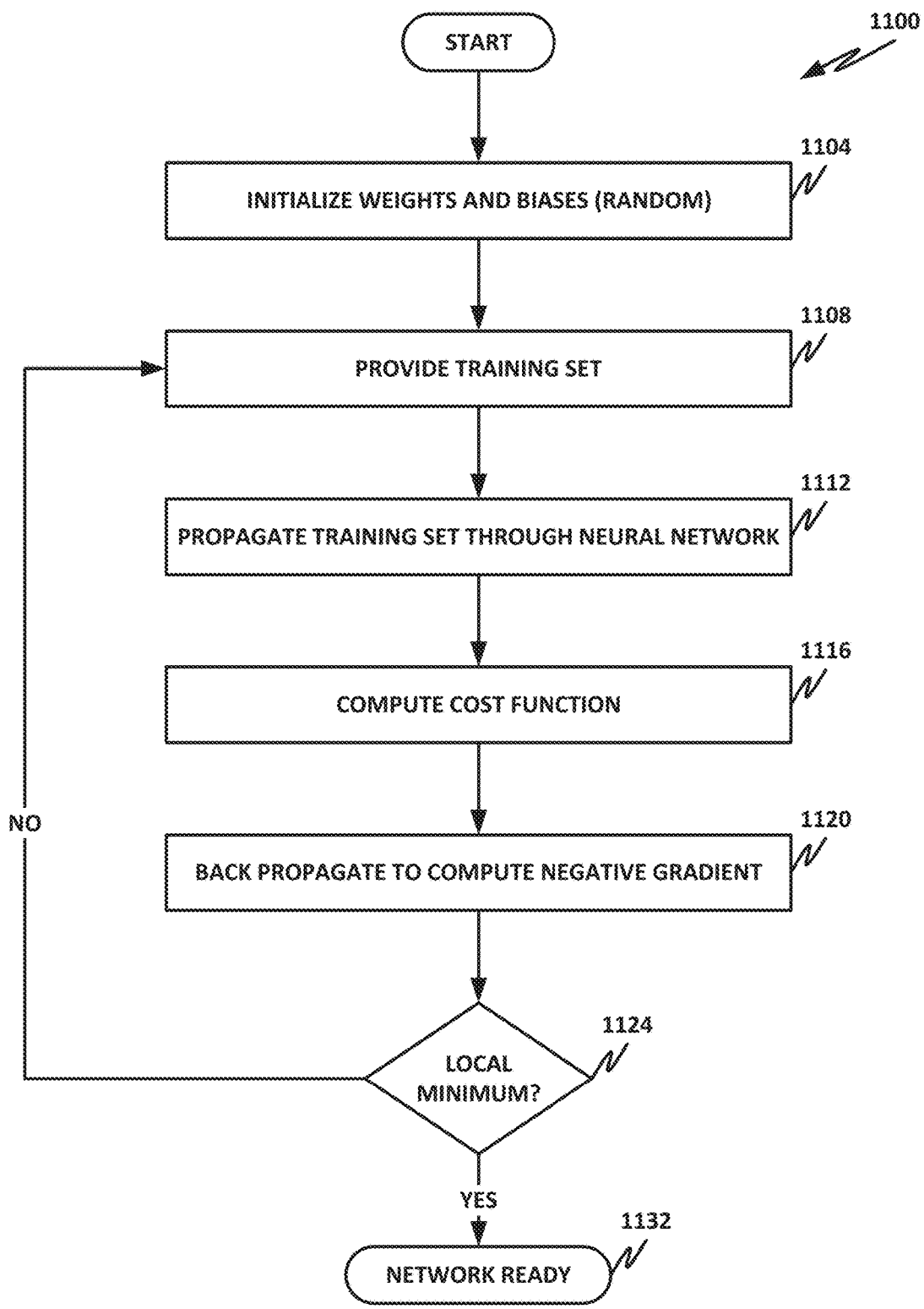
FIG. 11 is a flowchart of a method that may be used to train a neural network.
Figure 12:
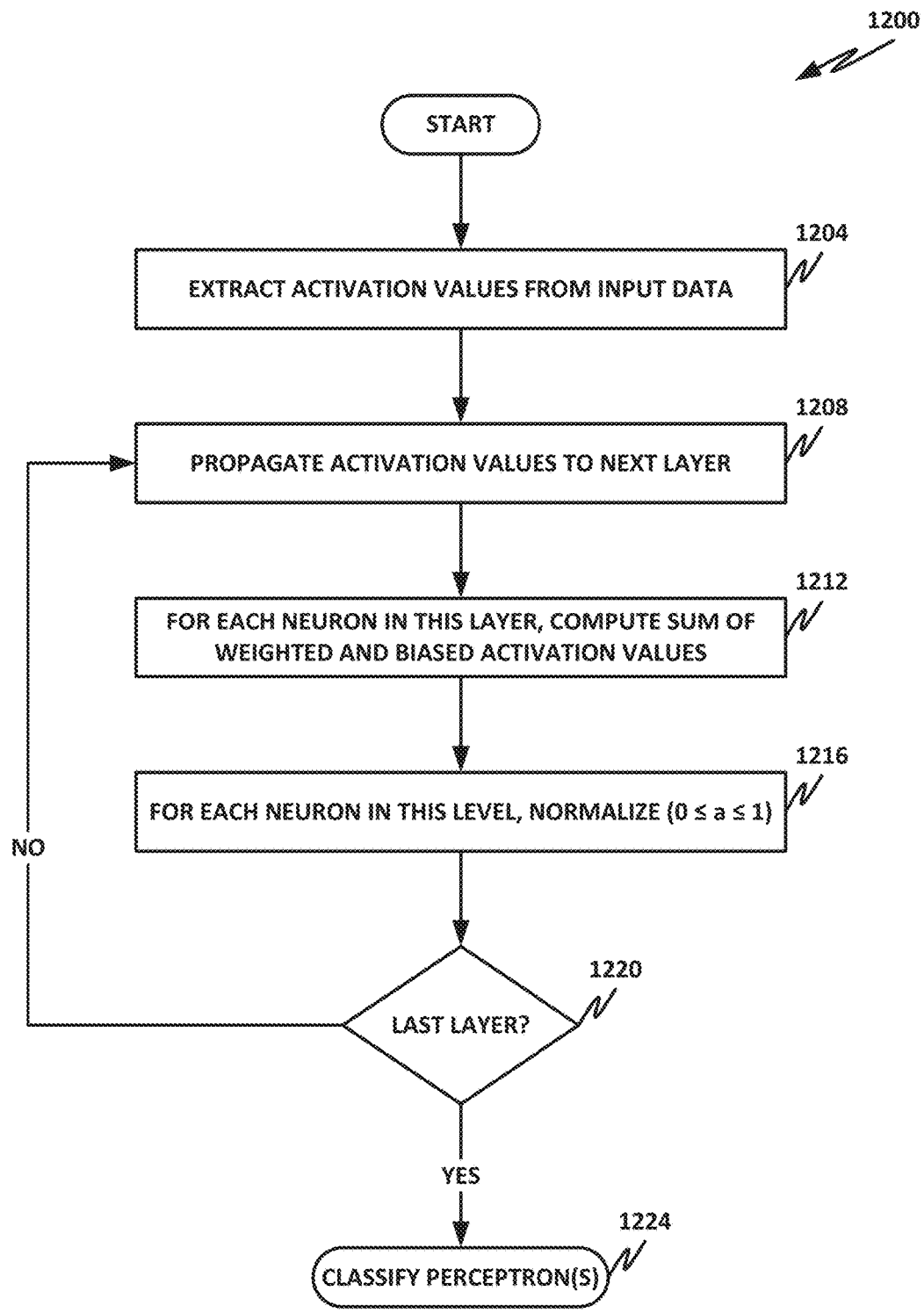
FIG. 12 is a flowchart of a method of using a neural network to classify an object.

FIGS. 10-12 illustrate selected elements of an artificial intelligence system or architecture. In these FIGURES, an elementary neural network is used as a representative embodiment of an artificial intelligence or machine learning architecture or engine. This should be understood to be a nonlimiting example, and other machine learning or artificial intelligence architectures are available, including for example symbolic learning, robotics, computer vision, pattern recognition, statistical learning, speech recognition, natural language processing, deep learning, convolutional neural networks, recurrent neural networks, object recognition and/or others.

FIG. 10 illustrates machine learning according to a "textbook" problem with real-world applications. A neural network such as the one illustrated in FIG. 10 could be used in conjunction with embodiments of this disclosure. In this case, a neural network 1000 is tasked with recognizing characters.

To simplify the description, neural network 1000 is tasked only with recognizing single digits in the range of 0 through 9. These are provided as an input image 1004. In this example, input image 1004 is a 28×28-pixel 8-bit grayscale image. In other words, input image 1004 is a square that is 28 pixels wide and 28 pixels high. Each pixel has a value between 0 and 255, with 0 representing white or no color, and 255 representing black or full color, with values in between representing various shades of gray. This provides a straightforward problem space to illustrate the operative principles of a neural network. It should be understood that only selected elements of neural network 1000 are illustrated in this FIGURE, and that real-world applications may be more complex, and may include additional features. Additional layers of complexity or functions may be provided in a neural network, or other artificial intelligence architecture, to meet the demands of a particular problem. Indeed, the architecture here is sometimes referred to as the "Hello World" problem of machine learning, and is provided here as but one example of how the machine learning or artificial intelligence functions of the present specification could be implemented.

In this case, neural network 1000 includes an input layer 1012 and an output layer 1020. In principle, input layer 1012 receives an input such as input image 1004, and at output layer 1020, neural network 1000 "lights up" a perceptron that indicates which character neural network 1000 thinks is represented by input image 1004.

Between input layer 1012 and output layer 1020 are some number of hidden layers 1016. The number of hidden layers 1016 will depend on the problem to be solved, the available compute resources, and other design factors. In general, the more hidden layers 1016, and the more neurons per hidden layer, the more accurate the neural network 1000 may become. However, adding hidden layers and neurons also increases the complexity of the neural network, and its demand on compute resources. Thus, some design skill is required to determine the appropriate number of hidden layers 1016, and how many neurons are to be represented in each hidden layer 1016.

Input layer 1012 includes, in this example, 784 "neurons" 1008. Each neuron of input layer 1012 receives information from a single pixel of input image 1004. Because input image 1004 is a 28×28 grayscale image, it has 784 pixels. Thus, each neuron in input layer 1012 holds 8 bits of information, taken from a pixel of input layer 1004. This 8-bit value is the "activation" value for that neuron.

Each neuron in input layer 1012 has a connection to each neuron in the first hidden layer in the network. In this example, the first hidden layer has neurons labeled 0 through M. Each of the M+1 neurons is connected to all 784 neurons in input layer 1012. Each neuron in hidden layer 1016 includes a kernel or transfer function, which is described in greater detail below. The kernel or transfer function determines how much "weight" to assign each connection from input layer 1012. In other words, a neuron in hidden layer 1016 may think that some pixels are more important to its function than other pixels. Based on this transfer function, each neuron computes an activation value for itself, which may be for example a decimal number between 0 and 1.

Each neuron in this layer is also connected to each neuron in the next layer, which has neurons from 0 to N. As in the previous layer, each neuron has a transfer function that assigns a particular weight to each of its M+1 connections, and computes its own activation value. In this manner, values are propagated along hidden layers 1016, until they reach the last layer, which has P+1 neurons labeled 0 through P. Each of these P+1 neurons has a connection to each neuron in output layer 1020. Output layer 1020 includes a number of neurons known as perceptrons that compute an activation value based on their weighted connections to each neuron in the last hidden layer 1016. The final activation value computed at output layer 1020 may be thought of as a "probability" that input image 1004 is the value represented by the perceptron. For example, if neural network 1000 operates perfectly, then perceptron 4 would have a value of 1.00, while each other perceptron would have a value of 0.00. This would represent a theoretically perfect detection. In practice, detection is not generally expected to be perfect, but it is desirable for perceptron 4 to have a value close to 1, while the other perceptrons have a value close to 0.

Conceptually, neurons in the hidden layers 1016 may correspond to "features." For example, in the case of computer vision, the task of recognizing a character may be divided into recognizing features such as the loops, lines, curves, or other features that make up the character. Recognizing each loop, line, curve, etc., may be further divided into recognizing smaller elements (e.g., line or curve segments) that make up that feature. Moving through the hidden layers from left to right, it is often expected and desired that each layer recognizes the "building blocks" that make up the features for the next layer. In practice, realizing this effect is itself a non-trivial problem, and may require greater sophistication in programming and training than is fairly represented in this simplified example.

The activation value for neurons in the input layer is simply the value taken from the corresponding pixel in the bitmap. The activation value (a) for each neuron in succeeding layers is computed according to a transfer function, which accounts for the "strength" of each of its connections to each neuron in the previous layer. The transfer can be written as a sum of weighted inputs (i.e., the activation value (a) received from each neuron in the previous layer, multiplied by a weight representing the strength of the neuron-to-neuron connection (w)), plus a bias value.

The weights may be used, for example, to "select" a region of interest in the pixmap that corresponds to a "feature" that the neuron represents. Positive weights may be used to select the region, with a higher positive magnitude representing a greater probability that a pixel in that region (if the activation value comes from the input layer) or a subfeature (if the activation value comes from a hidden layer) corresponds to the feature. Negative weights may be used for example to actively "de-select" surrounding areas or subfeatures (e.g., to mask out lighter values on the edge), which may be used for example to clean up noise on the edge of the feature. Pixels or subfeatures far removed from the feature may have for example a weight of zero, meaning those pixels should not contribute to examination of the feature.

The bias (b) may be used to set a "threshold" for detecting the feature. For example, a large negative bias indicates that the "feature" should be detected only if it is strongly detected, while a large positive bias makes the feature much easier to detect.

The biased weighted sum yields a number with an arbitrary sign and magnitude. This real number can then be normalized to a final value between 0 and 1, representing (conceptually) a probability that the feature this neuron represents was detected from the inputs received from the previous layer. Normalization may include a function such as a step function, a sigmoid, a piecewise linear function, a Gaussian distribution, a linear function or regression, or the popular "rectified linear unit" (ReLU) function. In the examples of this specification, a sigmoid function notation (σ) is used by way of illustrative example, but it should be understood to stand for any normalization function or algorithm used to compute a final activation value in a neural network.

The transfer function for each neuron in a layer yields a scalar value. For example, the activation value for neuron "0" in layer "1" (the first hidden layer), may be written as:

$$a_0^{(1)} = \sigma\left(w_0 a_0^{(0)} + w_1 a_1^{(0)} + \ldots \; w_{783} a_{783}^{(0)} + b\right)$$

In this case, it is assumed that layer 0 (input layer 1012) has 784 neurons. Where the previous layer has "n" neurons, the function can be generalized as:

$$a_0^{(1)} = \sigma\left(w_0 a_0^{(0)} + w_1 a_1^{(0)} + \ldots \; w_n a_n^{(0)} + b\right)$$

A similar function is used to compute the activation value of each neuron in layer 1 (the first hidden layer), weighted with that neuron's strength of connections to each neuron in layer 0, and biased with some threshold value. As discussed above, the sigmoid function shown here is intended to stand for any function that normalizes the output to a value between 0 and 1.

The full transfer function for layer 1 (with k neurons in layer 1) may be written in matrix notation as:

$$a^{(1)} = \sigma\left(\begin{bmatrix} w_{0,0} & \cdots & w_{0,n} \\ \vdots & \ddots & \vdots \\ w_{(k,0)} & \cdots & w_{k,n} \end{bmatrix} \begin{bmatrix} a_0^{(0)} \\ \vdots \\ a_n^{(0)} \end{bmatrix} + \begin{bmatrix} b_0 \\ \vdots \\ b_n \end{bmatrix}\right)$$

More compactly, the full transfer function for layer 1 can be written in vector notation as:

$$a^{(1)} = \sigma\left(W a^{(0)} + b\right)$$

Neural connections and activation values are propagated throughout the hidden layers 1016 of the network in this way, until the network reaches output layer 1020. At output layer 1020, each neuron is a "bucket" or classification, with the activation value representing a probability that the input object should be classified to that perceptron. The classifications may be mutually exclusive or multinominal. For example, in the computer vision example of character recognition, a character may be assigned only one value, or in other words, a single character is not expected to be simultaneously both a "4" and a "9." In that case, the neurons in output layer 1020 are binomial perceptrons. Ideally, only one value is above the threshold, causing the perceptron to metaphorically "light up," and that value is selected. In the case where multiple perceptrons "light up," the one with the highest probability may be selected. The final result is that only one value (in this case, "4") should be "lit up," while the rest should be "dark." Indeed, if the neural network were perfect, the "4" neuron would have an activation value of 1.00, while each other neuron would have an activation value of 0.00.

In the case of multinominal perceptrons, more than one output may be "lit up." For example, a neural network may determine that a particular document has high activation values for perceptrons corresponding to several departments, such as Accounting, Information Technology (IT), and Human Resources. On the other hand, the activation values for perceptrons for Legal, Manufacturing, and Shipping are low. In the case of multinominal classification, a threshold may be defined, and any neuron in the output layer with a probability above the threshold may be considered a "match" (e.g., the document is relevant to those departments). Those below the threshold are considered not a match (e.g., the document is not relevant to those departments).

The weights and biases of the neural network act as parameters, or "controls," wherein features in a previous layer are detected and recognized. When the neural network is first initialized, the weights and biases may be assigned randomly or pseudo-randomly. Thus, because the weights-and-biases controls are garbage, the initial output is expected to be garbage. In the case of a "supervised" learning algorithm, the network is refined by providing a "training" set, which includes a number of objects with known results. Because the "right" answer for each object is known, training sets can be used to iteratively move the weights and biases away from garbage values, and toward more useful values.

A common method for refining values includes "gradient descent" and "back-propagation." An illustrative gradient descent method includes computing a "cost" function, which measures the error in the network. For example, in the illustration, the "4" perceptron ideally has a value of "1.00," while the other perceptrons have an ideal value of "0.00." The cost function takes the difference between each output and its ideal value, squares the difference, and then takes a sum of all of the differences. Each training example will have its own computed cost. Initially, the cost function is very large, because the network doesn't know how to classify objects. As the network is trained and refined, the cost function value is expected to get smaller, as the weights and biases are adjusted toward more useful values.

With, for example, 100,000 training examples in play, an average cost (e.g., a mathematical mean) can be computed across all 100,00 training examples. This average cost provides a quantitative measurement of how "badly" the neural network is doing its detection job.

The cost function can thus be thought of as a single, very complicated formula, where the inputs are the parameters (weights and biases) of the network. Because the network may have thousands or even millions of parameters, the cost function has thousands or millions of input variables. The output is a single value representing a quantitative measurement of the error of the network. The cost function can be represented as:

$$C(w)$$

Wherein w is a vector containing all of the parameters (weights and biases) in the network. The minimum (absolute and/or local) can then be represented as a trivial calculus problem, namely:

$$\frac{dC}{dw}(w) = 0$$

Solving such a problem symbolically may be prohibitive, and in some cases not even possible, even with heavy computing power available. Rather, neural networks commonly solve the minimizing problem numerically. For example, the network can compute the slope of the cost function at any given point, and then shift by some small amount depending on whether the slope is positive or negative. The magnitude of the adjustment may depend on the magnitude of the slope. For example, when the slope is large, it is expected that the local minimum is "far away," so larger adjustments are made. As the slope lessens, smaller adjustments are made to avoid badly overshooting the local minimum. In terms of multi-vector calculus, this is a gradient function of many variables:

$$-\nabla C(w)$$

The value of $-\nabla C$ is simply a vector of the same number of variables as w, indicating which direction is "down" for this multivariable cost function. For each value in $-\nabla C$, the sign of each scalar tells the network which "direction" the value needs to be nudged, and the magnitude of each scalar can be used to infer which values are most "important" to change.

Gradient descent involves computing the gradient function, taking a small step in the "downhill" direction of the gradient (with the magnitude of the step depending on the magnitude of the gradient), and then repeating until a local minimum has been found within a threshold.

While finding a local minimum is relatively straightforward once the value of $-\nabla C$, finding an absolutely minimum is many times harder, particularly when the function has thousands or millions of variables. Thus, common neural networks consider a local minimum to be "good enough," with adjustments possible if the local minimum yields unacceptable results. Because the cost function is ultimately an average "error" value over the entire training set, minimizing the cost function yields a (locally) lowest average error.

In many cases, the difficult part of gradient descent is computing the value of $-\nabla C$. As mentioned above, computing this symbolically or exactly would be prohibitively difficult. A more practical method is to use "back-propagation" to numerically approximate a value for $-\nabla C$. Back-propagation may include, for example, examining an individual perceptron at the output layer, and determining an average cost value for that perceptron across the whole training set. Taking the "4" perceptron as an example, if the input image is a 4, it is desirable for the perceptron to have a value of 1.00, and for any input images that are not a 4, it is desirable to have a value of 0.00. Thus, an overall or average desired adjustment for the "4" perceptron can be computed.

However, the perceptron value is not hard-coded, but rather depends on the activation values received from the previous layer. The parameters of the perceptron itself (weights and bias) can be adjusted, but it may also be desirable to receive different activation values from the previous layer. For example, where larger activation values are received from the previous layer, the weight is multiplied by a larger value, and thus has a larger effect on the final activation value of the perceptron. The perceptron essentially "wishes" that certain activations from the previous layer were larger or smaller. Those "wishes" can be back-propagated to the previous-layer neurons.

At the next layer, the neuron takes into account the "wishes" from the next downstream layer in determining its own "preferred" activation value. Again, at this layer, the activation values are not hard-coded. Each neuron can adjust its own weights and biases, and then back-propagate changes to the activation values that it "wishes" would occur. The back-propagation continues, layer by layer, until the weights and biases of the first hidden layer are set. This layer cannot back-propagate desired changes to the input layer, because the input layer receives activation values directly from the input image.

After a round of "nudging," the network may receive another round of training with the same or a different training data set, and the process is repeated until a local and/or global minimum value is found for the cost function.

FIG. 11 is a flowchart of a method 1100. A method such as the one illustrated in FIG. 11 could be used in conjunction with embodiments of this disclosure. Method 1100 may be used to train a neural network, such as neural network 1000 of FIG. 10.

In block 1104, the network is initialized. Initially, neural network 1000 includes some number of neurons. Each neuron includes a transfer function or kernel. In the case of a neural network, each neuron includes parameters such as the weighted sum of values of each neuron from the previous layer, plus a bias. The final value of the neuron may be normalized to a value between 0 and 1, using a function such as the sigmoid or ReLU. Because the untrained neural network knows nothing about its problem space, and because it would be very difficult to manually program the neural network to perform the desired function, the parameters for each neuron may initially be set to just some random value. For example, the values may be selected using a pseudorandom number generator of a CPU, and then assigned to each neuron.

In block 1108, the neural network is provided a training set. In some cases, the training set may be divided up into smaller groups. For example, if the training set has 100,000 objects, this may be divided into 1,000 groups, each having 100 objects. These groups can then be used to incrementally train the neural network. In block 1108, the initial training set is provided to the neural network. Alternatively, the full training set could be used in each iteration.

In block 1112, the training data are propagated through the neural network. Because the initial values are random, and are therefore essentially garbage, it is expected that the output will also be a garbage value. In other words, if neural network 1000 of FIG. 10 has not been trained, when input image 1004 is fed into the neural network, it is not expected with the first training set that output layer 1020 will light up perceptron 4. Rather, the perceptrons may have values that are all over the map, with no clear winner, and with very little relation to the number 4.

In block 1116, a cost function is computed as described above. For example, in neural network 1000, it is desired for perceptron 4 to have a value of 1.00, and for each other perceptron to have a value of 0.00. The difference between the desired value and the actual output value is computed and squared. Individual cost functions can be computed for each training input, and the total cost function for the network can be computed as an average of the individual cost functions.

In block 1120, the network may then compute a negative gradient of this cost function to seek a local minimum value of the cost function, or in other words, the error. For example, the system may use back-propagation to seek a negative gradient numerically. After computing the negative gradient, the network may adjust parameters (weights and biases) by some amount in the "downward" direction of the negative gradient.

After computing the negative gradient, in decision block 1124, the system determines whether it has reached a local minimum (e.g., whether the gradient has reached 0 within the threshold). If the local minimum has not been reached, then the neural network has not been adequately trained, and control returns to block 1108 with a new training set. The training sequence continues until, in block 1124, a local minimum has been reached.

Now that a local minimum has been reached and the corrections have been back-propagated, in block 1132, the neural network is ready.

FIG. 12 is a flowchart of a method 1200. A method such as the one illustrated in FIG. 12 could be used in conjunction with embodiments of this disclosure. Method 1200 illustrates a method of using a neural network, such as network 1000 of FIG. 10, to classify an object.

In block 1204, the network extracts the activation values from the input data. For example, in the example of FIG. 10, each pixel in input image 1004 is assigned as an activation value to a neuron 1008 in input layer 1012.

In block 1208, the network propagates the activation values from the current layer to the next layer in the neural network. For example, after activation values have been extracted from the input image, those values may be propagated to the first hidden layer of the network.

In block 1212, for each neuron in the current layer, the neuron computes a sum of weighted and biased activation values received from each neuron in the previous layer. For example, in the illustration of FIG. 10, neuron 0 of the first hidden layer is connected to each neuron in input layer 1012. A sum of weighted values is computed from those activation values, and a bias is applied.

In block 1216, for each neuron in the current layer, the network normalizes the activation values by applying a function such as sigmoid, ReLU, or some other function.

In decision block 1220, the network determines whether it has reached the last layer in the network. If this is not the last layer, then control passes back to block 1208, where the activation values in this layer are propagated to the next layer.

Returning to decision block 1220, If the network is at the last layer, then the neurons in this layer are perceptrons that provide final output values for the object. In terminal 1224, the perceptrons are classified and used as output values.

Figure 13:
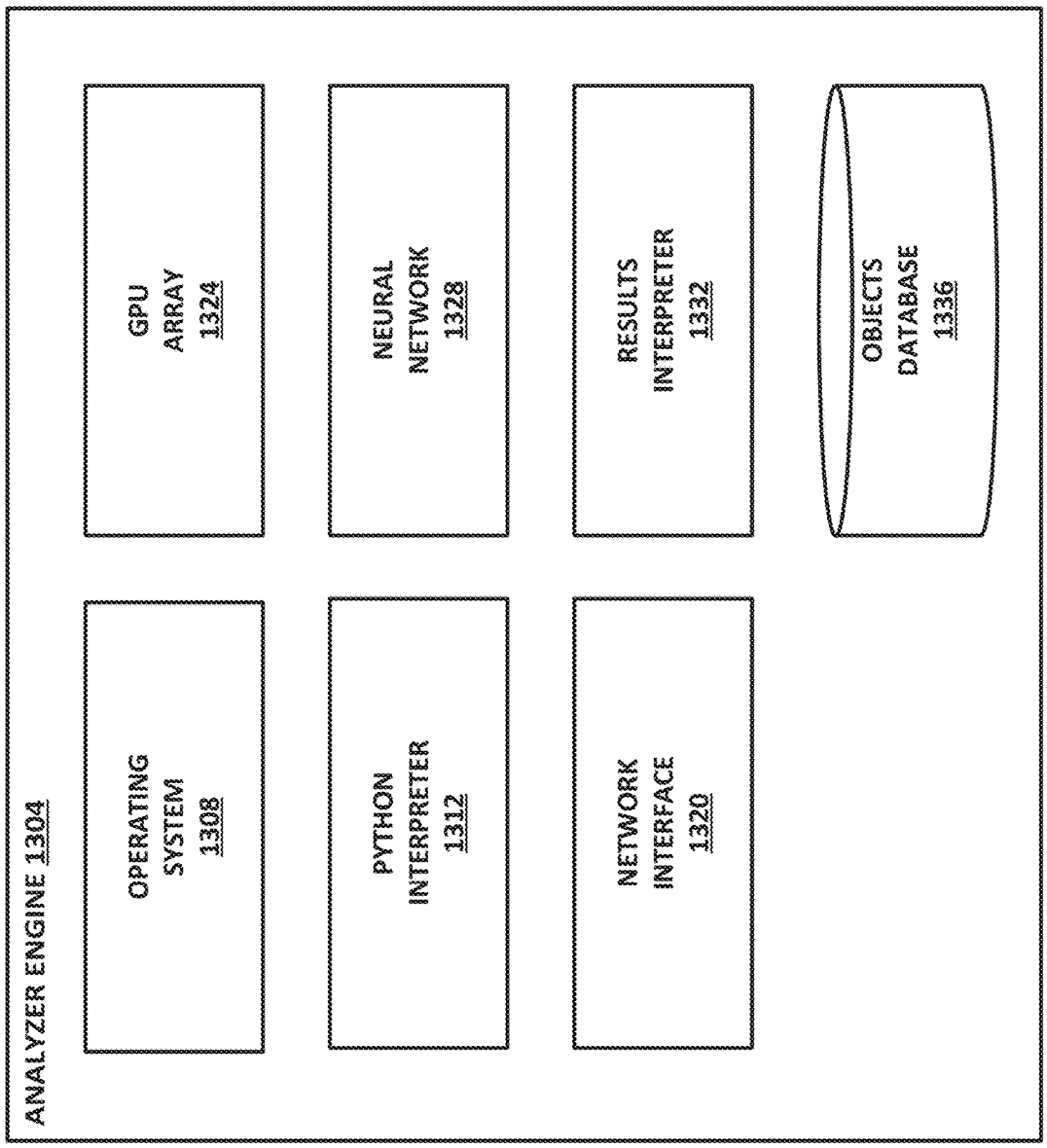
FIG. 13 is a block diagram illustrating selected elements of an analyzer engine.

FIG. 13 is a block diagram illustrating selected elements of an analyzer engine 1304. An analyzer engine such as the one illustrated in FIG. 13 could be used in conjunction with embodiments of this disclosure.

Analyzer engine 1304 may be configured to provide analysis services, such as via a neural network. FIG. 13 illustrates a platform for providing analysis services. Analysis, such as neural analysis and other machine learning models, may be used in some embodiments to provide one or more features of the present disclosure.

Note that analyzer engine 1304 is illustrated here as a single modular object, but in some cases, different aspects of analyzer engine 1304 could be provided by separate hardware, or by separate guests (e.g., virtual machines or containers) on a hardware system.

Analyzer engine 1304 includes an operating system 1308. Commonly, operating system 1308 is a Linux operating system, although other operating systems, such as Microsoft Windows, Mac OS X, or similar could be used. Analyzer engine 1304 also includes a Python interpreter 1312, which can be used to run Python programs. A Python module known as Numerical Python (NumPy) is often used for neural network analysis. Although this is a popular choice, other non-Python or non-NumPy-based systems could also be used. For example, the neural network could be implemented in Matrix Laboratory (MATLAB), C, C++, Fortran, R, or some other compiled or interpreted computer language.

GPU array 1324 may include an array of graphics processing units that may be used to carry out the neural network functions of neural network 1328. Note that GPU arrays are a popular choice for this kind of processing, but neural networks can also be implemented in CPUs, or in ASICs or FPGAs that are specially designed to implement the neural network.

Neural network 1328 includes the actual code for carrying out the neural network, and as mentioned above, is commonly programmed in Python.

Results interpreter 1332 may include logic separate from the neural network functions that can be used to operate on the outputs of the neural network to assign the object for particular classification, perform additional analysis, and/or provide a recommended remedial action.

Objects database 1336 may include a database of known malware objects and their classifications. Neural network 1328 may initially be trained on objects within objects database 1336, and as new objects are identified, objects database 1336 may be updated with the results of additional neural network analysis.

Once final results have been obtained, the results may be sent to an appropriate destination via network interface 1320.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and a non-volatile memory. Thus, for example, an "engine" as described above could include instructions encoded within a memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, non-transitory computer-readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or run-time memory (e.g., RAM), where instructions have already been loaded. These instructions, when fetched by the processor and executed, may provide methods or procedures as described herein.

In yet another embodiment, there may be one or more tangible, non-transitory computer-readable storage media having stored thereon executable instructions that, when executed, cause a hardware platform or other computing system, to carry out a method or procedure. For example, the instructions could be executable object code, including software instructions executable by a processor. The one or more tangible, non-transitory computer-readable storage media could include, by way of illustrative and non-limiting example, a magnetic media (e.g., hard drive), a flash memory, a read-only memory (ROM), optical media (e.g., CD, DVD, Blu-Ray), non-volatile random access memory (NVRAM), non-volatile memory (NVM) (e.g., Intel 3D Xpoint), or other non-transitory memory.

There are also provided herein certain methods, illustrated for example in flow charts and/or signal flow diagrams. The order or operations disclosed in these methods discloses one illustrative ordering that may be used in some embodiments, but this ordering is no intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a non-limiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the disclosure, as claimed, and the exclusion of certain elements from the FIGURES is not intended to imply that the element is to be excluded from the disclosure as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

What is claimed is:

1. A computer-implemented method of mitigating phishing, comprising:
    extracting text from a website under analysis;
    using a spell check algorithm to compare extracted words or phrases to a language dictionary of words or phrases selected from web pages known to be phishing targets, and using a spell counter to count misspell hits from the spell check algorithm;
    comparing the extracted words or phrases to a case-sensitive usage reference, and using a usage counter to count mismatched usage hits from the case-sensitive usage reference;
    combining the spell counter and the usage counter into a combined counter; and
    using the combined counter to identify the website under analysis as a suspected phishing site and taking a phishing mitigation action.

2. The method of claim 1, wherein the spell check algorithm is case insensitive.

3. The method of claim 1, wherein the spell check algorithm comprises symmetric delete.

4. The method of claim 1, wherein combining the spelling counter and the usage counter comprises a weighted sum.

5. The method of claim 1, wherein combining the spelling counter and the usage counter comprises computing a normalized sum.

6. The method of claim 1, wherein identifying the website under analysis as a suspected phishing site comprises using the combined counter as an input to a phishing analysis engine.

7. The method of claim 1, wherein identifying the website under analysis as a suspected phishing site comprises using the combined counter as an input to an artificial intelligence algorithm.

8. The method of claim 1, wherein identifying the website under analysis as a suspected phishing site comprises determining that the site includes two or more misspellings.

9. The method of claim 1, wherein identifying the website under analysis as a suspected phishing site comprises determining that the website under analysis includes one or more misspellings, and two or more usage mismatches.

10. The method of claim 1, wherein the phishing mitigation action comprises decorating the website under analysis for further human or machine analysis.

11. The method of claim 1, wherein the phishing mitigation action comprises blocking the website under analysis.

12. The method of claim 1, wherein the phishing mitigation action comprises sending a warning message a user.

13. The method of claim 1, wherein the usage counter is weighted according to a number of case-sensitive variations of a word or phrase that appear in the case-sensitive usage reference.

14. One or more tangible, nontransitory computer-readable media having stored thereon executable instructions to instruct a processor to:
    extract text from a website under analysis;
    spell check the extracted text against a language dictionary of words or phrases selected from known non-phishing websites, and accumulate misspell hits into a spelling counter;
    compare the spell-checked extracted text to a case-sensitive usage dictionary, and accumulate usage mismatches into a usage counter; and
    based on a combination of the spelling counter and usage counter, identify the website under analysis as a suspected phishing website and take a phishing mitigation action.

15. The one or more tangible, nontransitory computer-readable media of claim 14, wherein the instructions are further to perform a pre-analysis collection phase before extracting text from the website under analysis, comprising selecting a set of web pages known to be phishing targets, collecting common words and phrases from the set of web pages, and building the language dictionary and case-sensitive usage dictionary.

16. The one or more tangible, nontransitory computer-readable media of claim 15, wherein building the language dictionary comprises building a histogram of most common words and phrases in the set of web pages.

17. The one or more tangible, nontransitory computer-readable media of claim 15, wherein the set of web pages comprises web pages determined to be most popular as phishing targets.

18. The one or more tangible, nontransitory computer-readable media of claim 15, wherein the set of web pages comprises pages from a domain that collect sensitive personal or financial data.

19. A computing ecosystem comprising one or more computing apparatus, comprising:
    at least one processor circuit;
    a memory; and
    instructions stored within the memory to instruct the at least one processor circuit to:
        collect text from a user input form a website under analysis;
        spell check the collected text using a case-insensitive spell check algorithm with a language dictionary of words or phrases selected from user input forms of known non-phishing websites, and accumulate misspell hits into a spelling counter;
        compare the spell-checked extracted text to a case-sensitive usage dictionary, and accumulate usage mismatches into a usage counter; and
        combine the spelling counter and the usage counter into a combined counter, and based on the combined counter, identify the website under analysis as a suspected phishing website and take a phishing mitigation action.

20. The computing ecosystem of claim 19, wherein combining the spelling counter and the usage counter comprises a weighted sum or normalized sum.

* * * * *